United States Patent
Roumeliotis et al.

(10) Patent No.: US 10,254,118 B2
(45) Date of Patent: Apr. 9, 2019

(54) EXTRINSIC PARAMETER CALIBRATION OF A VISION-AIDED INERTIAL NAVIGATION SYSTEM

(71) Applicant: Regents of the University of Minnesota, Minneapolis, MN (US)

(72) Inventors: Stergios I. Roumeliotis, St Paul, MN (US); Dimitrios G. Kottas, Minneapolis, MN (US); Kejian J. Wu, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 530 days.

(21) Appl. No.: 14/768,733

(22) PCT Filed: Feb. 21, 2014

(86) PCT No.: PCT/US2014/017773
§ 371 (c)(1),
(2) Date: Aug. 18, 2015

(87) PCT Pub. No.: WO2014/130854
PCT Pub. Date: Aug. 28, 2014

(65) Prior Publication Data
US 2016/0005164 A1     Jan. 7, 2016

Related U.S. Application Data

(60) Provisional application No. 61/767,691, filed on Feb. 21, 2013, provisional application No. 61/767,701, filed on Feb. 21, 2013.

(51) Int. Cl.
*G01C 21/00*     (2006.01)
*G01C 21/16*     (2006.01)
(Continued)

(52) U.S. Cl.
CPC ............. *G01C 21/165* (2013.01); *B25J 5/00* (2013.01); *B25J 9/1664* (2013.01); *B25J 9/1697* (2013.01);
(Continued)

(58) Field of Classification Search
CPC .......... G01C 21/00; G06F 19/00; H04N 7/18; G06K 9/00
See application file for complete search history.

(56) References Cited

U.S. PATENT DOCUMENTS 5,847,755 A   12/1998   Wixson et al.
6,104,861 A   8/2000    Tsukagoshi
(Continued)

FOREIGN PATENT DOCUMENTS

WO   WO 2015013418 A2   1/2015
WO   WO 2015013534 A1   1/2015

OTHER PUBLICATIONS

Ayache et al., "Maintaining Representations of the Environment of a Mobile Robot," IEEE Transactions on Robotics and Automation, vol. 5, No. 6, Dec. 1989, pp. 804-819.
(Continued)

*Primary Examiner* — Maryam A Nasri
(74) *Attorney, Agent, or Firm* — Shumaker & Sieffert, P.A.

(57) ABSTRACT

This disclosure describes various techniques for use within a vision-aided inertial navigation system (VINS). A VINS comprises an image source to produce image data comprising a plurality of images, and an inertial measurement unit (IMU) to produce IMU data indicative of a motion of the vision-aided inertial navigation system while producing the image data, wherein the image data captures features of an external calibration target that is not aligned with gravity. The VINS further includes a processing unit comprising an
(Continued)

estimator that processes the IMU data and the image data to compute calibration parameters for the VINS concurrently with computation of a roll and pitch of the calibration target, wherein the calibration parameters define relative positions and orientations of the IMU and the image source of the vision-aided inertial navigation system.

24 Claims, 15 Drawing Sheets

(51) Int. Cl.
| | |
|---|---|
| H04N 13/204 | (2018.01) |
| B25J 5/00 | (2006.01) |
| B25J 9/16 | (2006.01) |
| G06F 3/0346 | (2013.01) |
| G06T 7/20 | (2017.01) |
| G06T 7/80 | (2017.01) |
| G06T 7/70 | (2017.01) |
| G06T 7/277 | (2017.01) |

(52) U.S. Cl.
CPC ........... *G01C 21/16* (2013.01); *G06F 3/0346* (2013.01); *G06T 7/20* (2013.01); *G06T 7/277* (2017.01); *G06T 7/70* (2017.01); *G06T 7/80* (2017.01); *H04N 13/204* (2018.05); *G06T 2207/10021* (2013.01); *G06T 2207/30244* (2013.01); *Y10S 901/01* (2013.01); *Y10S 901/09* (2013.01)

(56) References Cited

U.S. PATENT DOCUMENTS

| | | | |
|---|---|---|---|
| 7,015,831 | B2 | 3/2006 | Karlsson et al. |
| 7,162,338 | B2 | 1/2007 | Goncalves et al. |
| 7,991,576 | B2 | 8/2011 | Roumeliotis |
| 8,577,539 | B1 | 11/2013 | Morrison et al. |
| 8,965,682 | B2 | 2/2015 | Tangirala et al. |
| 8,996,311 | B1 | 3/2015 | Morin et al. |
| 9,031,809 | B1 | 5/2015 | Kumar et al. |
| 9,243,916 | B2 | 1/2016 | Roumeliotis et al. |
| 9,607,401 | B2 | 3/2017 | Roumeliotis et al. |
| 9,658,070 | B2 | 5/2017 | Roumeliotis et al. |
| 9,709,404 | B2 | 7/2017 | Roumeliotis et al. |
| 2002/0198632 | A1 | 12/2002 | Breed et al. |
| 2004/0073360 | A1 | 4/2004 | Foxlin |
| 2004/0167667 | A1 | 8/2004 | Goncalves et al. |
| 2005/0013583 | A1 | 1/2005 | Itoh |
| 2008/0167814 | A1 | 7/2008 | Samarasekera et al. |
| 2008/0265097 | A1 | 10/2008 | Stecko et al. |
| 2008/0279421 | A1 | 11/2008 | Hamza et al. |
| 2009/0248304 | A1* | 10/2009 | Roumeliotis ........... G01C 21/16 701/500 |
| 2010/0110187 | A1 | 5/2010 | von Flotow et al. |
| 2010/0220176 | A1 | 9/2010 | Ziemeck et al. |
| 2012/0121161 | A1 | 5/2012 | Eade et al. |
| 2012/0194517 | A1 | 8/2012 | Izadi et al. |
| 2013/0335562 | A1 | 12/2013 | Ramanandan et al. |
| 2014/0316698 | A1 | 10/2014 | Roumeliotis et al. |
| 2014/0333741 | A1* | 11/2014 | Roumeliotis ............. G01S 5/16 348/61 |
| 2015/0356357 | A1 | 12/2015 | McManus et al. |
| 2015/0369609 | A1* | 12/2015 | Roumeliotis ........ G01C 21/165 701/532 |
| 2016/0005164 | A1* | 1/2016 | Roumeliotis ........ G01C 21/165 348/116 |
| 2016/0161260 | A1 | 6/2016 | Mourikis |
| 2016/0305784 | A1* | 10/2016 | Roumeliotis ........ G01C 21/165 |
| 2016/0327395 | A1* | 11/2016 | Roumeliotis ........ G01C 21/165 |
| 2017/0261324 | A1* | 9/2017 | Roumeliotis ........ G01C 21/165 |
| 2017/0294023 | A1* | 10/2017 | Roumeliotis ............. G01S 5/16 |
| 2017/0343356 | A1* | 11/2017 | Roumeliotis ........... G01C 21/32 |

OTHER PUBLICATIONS

Bartoli et al., "Structure from Motion Using Lines: Representation, Triangulation and Bundle Adjustment," Computer Vision and Image Understanding, vol. 100, Aug. 11, 2005, pp. 416-441.

Bayard et al., "An Estimation Algorithm for Vision-Based Exploration of Small Bodies in Space," 2005 American Control Conference, Jun. 8-10, 2005, pp. 4589-4595.

Breckenridge, "Interoffice Memorandum to T. K. Brown, Quaternions—Proposed Standard Conventions," 10M 343-79-1199, Oct. 31, 1979, 12 pp.

Canny, "A Computational Approach to Edge Detection," IEEE Transactions on Pattern Analysis and Machine Intelligence, vol. 8, No. 6, Nov. 1986, pp. 679-698.

Chen, "Pose Determination from Line-to-Plane Correspondences: Existence Condition and Closed-Form Solutions," Proceedings on the $3^{rd}$ International Conference on Computer Vision, Dec. 4-7, 1990, pp. 374-378.

Chiuso et al., "Structure From Motion Causally Integrated Over Time," IEEE Transactions on Pattern Analysis and Machine Intelligence, vol. 24, No. 4, Apr. 2002, pp. 523-535.

Davison et al., "Simultaneous Localisation and Map-Building Using Active Vision," Jun. 2001, 18 pp.

Deans "Maximally Informative Statistics for Localization and Mapping," Proceedings of the 2002 IEEE International Conference on Robotics & Automation, May 2002, pp. 1824-1829.

Dellaert et al., "Square Root SAM: Simultaneous Localization and Mapping via Square Root Information Smoothing," International Journal of Robotics and Research, vol. 25, No. 12, Dec. 2006, pp. 1181-1203.

Diel, "Stochastic Constraints for Vision-Aided Inertial Navigation," Massachusetts Institute of Technology, Department of Mechanical Engineering, Master Thesis, Jan. 2005, 106 pp.

Eade et al., "Scalable Monocular SLAM," Proceedings of the 2006 IEEE Computer Society Conference on Computer Vision and Pattern Recognition (CVPR '06), vol. 1, Jun. 17-22, 2006, 8 pp.

Erdogan et al., "Planar Segmentation of RGBD Images Using Fast Linear Filling and Markov Chain Monte Carlo," Proceedings of the IEEE International Conference on Computer and Robot Vision, May 27-30, 2012, pp. 32-39.

Eustice et al., "Exactly Sparse Delayed-slate Filters for View-based SLAM," IEEE Transactions on Robotics, vol. 22, No. 6, Dec. 2006, pp. 1100-1114.

Eustice et al., "Visually Navigating the RMS Titanic With SLAM Information Filters," Proceedings of Robotics Science and Systems, Jun. 2005, 9 pp.

Guo et al., "IMU-RGBD Camera 3D Pose Estimation and Extrinsic Calibration: Observability Analysis and Consistency Improvement," Proceedings of the IEEE International Conference on Robotics and Automation. May 6-10, 2013, pp. 2935-2942.

Guo et al., "Observability-constrained EKF Implementation of the IMU-RGBD Camera Navigation Using Point and Plane Features," Technical Report, University of Minnesota, Mar. 2013, 6 pp.

Hermann et al., "Nonlinear Controllability and Observability," IEEE Transactions on Automatic Control, vol. 22, No. 5, Oct. 1977, pp. 728-740.

Herrera et al., "Joint Depth and Color Camera Calibration with Distortion Correction," IEEE Transactions on Pattern Analysis and Machine Intelligence, vol. 34, No. 10, Oct. 2012, pp. 2058-2064.

Hesch et al., "Observability-constrained Vision-aided Inertial Navigation," University of Minnesota, Department of Computer Science and Engineering, MARS Lab, Feb. 2012, 24 pp.

Hesch et al., "Towards Consistent Vision-aided Inertial Navigation," Proceedings of the 10th International Workshop on the Algorithmic Foundations of Robotics, Jun. 13-15, 2012, 16 pp.

Huang et al., "Visual Odometry and Mapping for Autonomous Flight Using an RGB-D Camera," Proceedings of the International Symposium on Robotics Research, Aug. 28-Sep. 1, 2011, 16 pp.

Huster, "Relative Position Sensing by Fusing Monocular Vision and Inertial Rate Sensors," Stanford University, Department of Electrical Engineering Dissertation, Jul. 2003, 158 pp.

(56) References Cited

OTHER PUBLICATIONS

Johannsson et al., "Temporally Scalable Visual Slam Using a Reduced Pose Graph," in Proceedings of the IEEE International Conference on Robotics and Automation, May 6-10, 2013, 8 pp.
Jones et al., "Visual-inertial Navigation, Mapping and Localization: A Scalable Real-time Causal Approach," International Journal of Robotics Research, vol. 30, No. 4, Mar. 31, 2011, pp. 407-430.
Kaess et al., "iSAM: Incremental Smoothing and Mapping," IEEE Transactions on Robotics, Manuscript, Sep. 7, 2008, 14 pp.
Kaess et al., "iSAM2: Incremental Smoothing and Mapping Using the Bayes Tree," International Journal of Robotics Research, vol. 31, No. 2, Feb. 2012, pp. 216-235.
Klein et al., "Parallel Tracking and Mapping for Small AR Workspaces," Proceedings of the IEEE and ACM International Symposium on Mixed and Augmented Reality, Nov. 13-16, 2007, pp. 225-234.
Konolige et al., "Efficient Sparse Pose Adjustment for 2D Mapping," Proceedings of the IEEE/RSJ International Conference on Intelligent Robots and Systems, Oct. 18-22, 2010, pp. 22-29.
Konolige et al., "FrameSLAM: From Bundle Adjustment to Real-Time Visual Mapping," IEEE Transactions on Robotics, vol. 24, No. 5, Oct. 2008, pp. 1066-1077.
Konolige et al., "View-based Maps," International Journal of Robotics Research, vol. 29, No. 8, Jul. 2010, pp. 941-957.
Kottas et al., "On the Consistency of Vision-aided Inertial Navigation," Proceedings of the International Symposium on Experimental Robotics, Jun. 17-20, 2012, 15 pp.
Kummerle et al., "$g^2o$: A General Framework for Graph Optimization," Proceedings of the IEEE International Conference on Robotics and Automation, May 9-13, 2011, pp. 3607-3613.
Langelaan, "State Estimation for Autonomous Flight in Cluttered Environments," Stanford University, Department of Aeronautics and Astronautics, Dissertation, Mar. 2006, 128 pp.
Liu et al., "Estimation of Rigid Body Motion Using Straight Line Correspondences," Computer Vision, Graphics, and Image Processing, vol. 43, No. 1, Jul. 1988, pp. 37-52.
Li et al., "Improving the Accuracy of EKF-based Visual-Inertial Odometry," 2012 IEEE International Conference on Robotics and Automation, May 14-18, 2012, pp. 828-835.
Lowe, "Distinctive Image Features From Scale-Invariant Keypoints," International Journal of Computer Vision, Jan. 5, 2004, 28 pp.
Lupton et al., "Visual-inertial-aided Navigation for High-dynamic Motion in Built Environments Without Initial Conditions," IEEE Transactions on Robotics, vol. 28, No. 1, Feb. 2012, pp. 61-76.
Martinelli, "Vision and IMU Data Fusion: Closed-form Solutions for Attitude, Speed, Absolute Scale, and Bias Determination," IEEE Transactions on Robotics, vol. 28 No. 1, Feb. 2012, pp. 44-60.
Matas et al., "Robust Detection of Lines Using the Progressive Probabilistic Hough Transformation," Computer Vision and Image Understanding, vol. 78, No. 1, Apr. 2000, pp. 119-137.
McLauchlan, "The Variable State Dimension Filter Applied to Surface-Based Structure From Motion CVSSP Technical Report VSSP-TR-4/99," University of Surrey, Department of Electrical Engineering, Dec. 1999, 52 pp.
Meltzer et al., "Edge Descriptors for Robust Wide-baseline Correspondence," IEEE Conference on Computer Vision and Pattern Recognition, Jun. 23-28, 2008, pp. 1-8.
Mirzaei et al., "A Kalman Filter-Based Algorithm for IMU-Camera Calibration: Observability Analysis and Performance Evaluation," IEEE Transactions on Robotics, vol. 24, No. 5, Oct. 2008, pp. 1143-1156.
Mirzaei et al., "Globally Optimal Pose Estimation from Line Correspondences," IEEE International Conference on Robotics and Automation, May 9-13, 2011, pp. 5581-5588.
Mirzaei et al., "Optimal Estimation of Vanishing Points in a Manhattan World," IEEE International Conference on Computer Vision, Nov. 6-13, 2011, pp. 2454-2461.
Montiel et al., "Unified Inverse Depth Parametrization for Monocular SLAM," Proceedings of Robotics: Science and Systems II (RSS-06), Aug. 16-19, 2006, 8 pp.
Mourikis et al., "A Multi-State Constraint Kalman Filter for Vision-aided Inertial Navigation," IEEE, International Conference on Robotics and Automation, Apr. 10-14, 2007, pp. 3565-3572.
Mourikis et al., "Vision-Aided Inertial Navigation for Spacecraft Entry, Descent, and Landing," IEEE Transactions on Robotics, vol. 25, No. 2, Apr. 2009, pp. 264-280.
Mourikis et al., "On the Treatment of Relative-Pose Measurements for Mobile Robot Localization," Proceedings of the 2006 IEEE International Conference on Robotics and Automation, May 2006, pp. 2277-2284.
Nister et al., "Visual Odometry for Ground Vehicle Applications," Journal of Field Robotics, vol. 23, No. 1, Jan. 2006, 35 pp.
Oliensis, "A New Structure From Motion Ambiguity," IEEE Transactions on Pattern Analysis and Machine Intelligence, vol. 22, No. 7, Jul. 2000, 30 pp.
Ong et al., "Six DoF Decentralised SLAM," Proceedings of the Australasian Conference on Robotics and Automation, 2003, 10 pp. (Applicant points out that, in accordance with MPEP 609.04(a), the 2003 year of publication is sufficiently earlier than the effective U.S. filing date and any foreign priority date of Feb. 21, 2013 so that the particular month of publication is not in issue.).
Prazenica et al., "Vision-Based Kalman Filtering for Aircraft State Estimation and Structure From Motion," AIAA Guidance, Navigation, and Control Conference and Exhibit, Aug. 15-18, 2005, 13 pp.
Roumeliotis et al., "Stochastic Cloning: A Generalized Framework for Processing Relative State Measurements," Proceedings of the 2012 IEEE International Conference on Robotics and Automation, May 11-15, 2002, pp. 1788-1795.
Roumeliotis et al., "Augmenting Inertial Navigation With Image-Based Motion Estimation," IEEE International Conference on Robotics and Automation, vol. 4, 2002, 8 pp. (Applicant points out that, in accordance with MPEP 609.04(a), the 2002 year of publication is sufficiently earlier than the effective U.S. filing date and any foreign priority date of Feb. 21, 2013 so that the particular month of publication is not in issue.).
Schmid et al., "Automatic Line Matching Across Views," Proceedings of the IEEE Computer Science Conference on Computer Vision and Pattern Recognition, Jun. 17-19, 1997, pp. 666-671.
Servant et al., "Improving Monocular Plane-based SLAM with Inertial Measurements," 2010 IEEE/RSJ International Conference on Intelligent Robots and Systems, Oct. 18-22, 2010, pp. 3810-3815.
Sibley et al., "Sliding Window Filter with Application to Planetary Landing," Journal of Field Robotics, vol. 27, No. 5, Sep./Oct. 2010, pp. 587-608.
Smith et al., "On the Representation and Estimation of Spatial Uncertainty," International Journal of Robotics Research, vol. 5, No. 4, 1986, pp. 56-68 (Applicant points out that, in accordance with MPEP 609.04(a), the 1986 year of publication is sufficiently earlier than the effective U.S. filing date and any foreign priority date of Feb. 21, 2013 so that the particular month of publication is not in issue.).
Smith et al., "Real-time Monocular Slam with Straight Lines," British Machine Vision Conference, vol. 1, Sep. 2006, pp. 17-26.
Soatto et al., "Motion Estimation via Dynamic Vision," IEEE Transactions on Automatic Control, vol. 41, No. 3, Mar. 1996, pp. 393-413.
Soatto et al., "Recursive 3-D Visual Motion Estimation Using Subspace Constraints," International Journal of Computer Vision, vol. 22, No. 3, Mar. 1997, pp. 235-259.
Spetsakis et al., "Structure from Motion Using Line Correspondences," International Journal of Computer Vision, vol. 4, No. 3, Jun. 1990, pp. 171-183.
Strelow, "Motion Estimation From Image and Inertial Measurements," Carnegie Mellon University, School of Computer Science, Dissertation, CMU-CS-04-178, Nov. 2004, 164 pp.
Taylor et al., "Structure and Motion from Line Segments in Multiple Images," IEEE Transactions on Pattern Analysis and Machine Intelligence, vol. 17, No. 11, Nov. 1995, pp. 1021-1032.
Trawny et al., "Indirect Kalman Filter for 3D Attitude Estimation," University of Minnesota, Department of Computer Science & Engineering, MARS Lab, Mar. 2005, 25 pp.

(56) References Cited

OTHER PUBLICATIONS

Triggs et al., "Bundle Adjustment—A Modern Synthesis," Vision Algorithms: Theory & Practice, LNCS 1883, Apr. 12, 2002, 71 pp.
Weiss et al., "Real-time Metric State Estimation for Modular Vision-inertial Systems," 2011 IEEE International Conference on Robotics and Automation, May 9-13, 2011, pp. 4531-4537.
Weiss et al., "Real-time Onboard Visual-Inertial State Estimation and Self-Calibration of MAVs in Unknown Environments," 2012 IEEE International Conference on Robotics and Automation, May 14-18, 2012, pp. 957-964.
Weiss et al., "Versatile Distributed Pose Estimation and sensor Self-Calibration for an Autonomous MAV," 2012 IEEE International Conference on Robotics and Automations, May 14-18, 2012, pp. 31-38.
Weng et al., "Motion and Structure from Line Correspondences: Closed-Form Solution, Uniqueness, and Optimization," IEEE Transactions on Pattern Analysis and. Machine Intelligence, vol. 14, No. 3, Mar. 1992, pp. 318-336.
Williams et al., "Feature and Pose Constrained Visual Aided Inertial Navigation for Computationally Constrained Aerial Vehicles," 2011 IEEE International Conference on Robotics and Automation, May 9-13, 2011, pp. 431-438.
Zhou et al., "Determining 3-D Relative Transformations for Any Combination of Range and Bearing Measurements," IEEE Transactions on Robotics, vol. 29, No. 2, Apr. 2013, pp. 458-474.
Horn et al., "Closed-form solution of absolute orientation using orthonormal matrices," Journal of the Optical Society of America A, vol. 5, No. 7, Jul. 1988, pp. 1127-1135.
Kottas et al., "Efficient and Consistent Vision-aided Inertial Navigation using Line Observations," Department of Computer Science & Engineering, University of Minnesota, MARS Lab, TR-2012-002, Sep. 2012, 14 pp.
Bierman, "Factorization Methods for Discrete Sequential Estimation," Mathematics in Science and Engineering, Academic Press, vol. 128, 1977, 259 pp.
Lucas et al., "An iterative image registration technique with an application to stereo vision," Proceedings of $7^{th}$ the International Joint Conference on Artificial Intelligence, Aug. 24-28, 1981, pp. 674-679.
Kneip et al., "Robust Real-Time Visual Odometry with a Single Camera and an IMU," Proceedings of the British Machine Vision Conference, Aug. 29-Sep. 2, 2011, pp. 16.1-16.11.
Chiu et al., "Robust vision-aided navigation using sliding-window factor graphs," 2013 IEEE International Conference on Robotics and Automation, May 6-10, 2013, pp. 46-53.
Kottas et al., "An iterative Kalman smoother for robust 3D localization on mobile and wearable devices," Proceedings of the IEEE International Conference on Robotics and Automation, May 26-30, 2015, pp. 6336-6343.
Li et al., "Real-time Motion Tracking on a Cellphone using Inertial Sensing and a Rolling-Shutter Camera," 2013 IEEE International Conference on Robotics and Automation (ICRA), May 6-10, 2013, 8 pp.
Li et al., "Vision-aided inertial navigation with rolling-shutter cameras," The International Journal of Robotics Research, retrieved from ijr.sagepub.com on May 22, 2015, 18 pp.
International Search Report and Written Opinion of International Application No. PCT/US2014/017773, dated Jul. 11, 2014, 14 pp.
International Preliminary Report on Patentability from International Application No. PCT/US2014/017773, dated Sep. 3, 2015, 7 pp.
Ait-Aider et al., "Simultaneous object pose and velocity computation using a single view from a rolling shutter camera," Proceedings of the IEEE European Conference on Computer Vision, May 7-13, 2006, pp. 56-68.
Baker et al., "Removing rolling shutter wobble," Proceedings of the IEEE Conference on Computer Vision and Pattern Recognition, Jun. 13-18, 2010, pp. 2392-2399.
Boyd et al., "Convex Optimization," Cambridge University Press, 2004, 730 pp. (Applicant points out that, in accordance with MPEP 609.04(a), the 2004 year of publication is sufficiently earlier than the effective U.S. filing date and any foreign priority date of Feb. 21, 2013 so that the particular month of publication is not in issue.).
Furgale et al., "Unified temporal and spatial calibration for multi-sensor systems," Proceedings of the IEEE/RSJ International Conference on Intelligent Robots and Systems, Nov. 3-7, 2013, pp. 1280-1286.
Golub et al., "Matrix Computations, Third Edition," The Johns Hopkins University Press, 2012, 723 pp. (Applicant points out that, in accordance with MPEP 609.04(a), the 2012 year of publication is sufficiently earlier than the effective U.S. filing date and any foreign priority date of Feb. 21, 2013 so that the particular month of publication is not in issue.).
Guo et al., "IMU-RGBD camera 3D pose estimation and extrinsic calibration: Observability analysis and consistency improvement," Proceedings of the IEEE International Conference on Robotics and Automation, May 6-10, 2013, pp. 2920-2927.
Harris et al., "A combined corner and edge detector," Proceedings of the Alvey Vision Conference, Aug. 31-Sep. 2, 1988, pp. 147-151.
Hesch et al., "Consistency analysis and improvement of vision-aided inertial navigation," IEEE Transactions on Robotics, vol. 30, No. 1, Feb. 2014, pp. 158-176.
Huang et al., "Observability-based rules for designing consistent EKF slam estimators," International Journal of Robotics Research, vol. 29, No. 5, Apr. 2010, pp. 502-528.
Jia et al., "Probabilistic 3-D motion estimation for rolling shutter video rectification from visual and inertial measurements," Proceedings of the IEEE International Workshop on Multimedia Signal Processing, Sep. 2012, pp. 203-208.
Kelly et al., "A general framework for temporal calibration of multiple proprioceptive and exteroceptive sensors," Proceedings of International Symposium on Experimental Robotics, Dec. 18-21, 2010, 15 pp.
Kelly et al., "Visual-inertial sensor fusion: Localization, mapping and sensor-to-sensor self-calibration," International Journal of Robotics Research, vol. 30, No. 1, Jan. 2011, pp. 56-79.
Li et al., "3-D motion estimation and online temporal calibration for camera-IMU systems," Proceedings of the IEEE International Conference on Robotics and Automation, May 6-10, 2013, pp. 5709-5716.
Liu et al., "Multi-aided inertial navigation for ground vehicles in outdoor uneven environments," Proceedings of the IEEE International Conference on Robotics and Automation, Apr. 18-22, 2005, pp. 4703-4708.
Oth et al., "Rolling shutter camera calibration," Proceedings of the IEEE Conference on Computer Vision and Pattern Recognition, Jun. 23-28, 2013, pp. 1360-1367.
Shoemake et al., "Animating rotation with quaternion curves," ACM SIGGRAPH Computer Graphics, vol. 19, No, 3, Jul. 22-26, 1985, pp. 245-254.
Kottas et al., "Detecting and dealing with hovering maneuvers in vision-aided inertial navigation systems," Proceedings of the IEEE/RSJ International Conference on Intelligent Robots and Systems, Nov. 3-7, 2013, pp. 3172-3179.
Garcia et al., "Augmented State Kalman Filtering for AUV Navigation." Proceedings of the 2002 IEEE International Conference on Robotics & Automation, May 2002, 6 pp.
Bouguet, "Camera Calibration Toolbox for Matlab," retrieved from http://www.vision.caltech.edu/bouguetj/calib_doc/., Oct. 14, 2015, 5 pp.
Dong-Si et al., "Motion Tracking with Fixed-lag Smoothing: Algorithm and Consistency Analysis," Proceedings of the IEEE International Conference on Robotics and Automation, May 9-13, 2011, 8 pp.
Golub et al., "Matrix Computations, Fourth Edition," The Johns Hopkins University Press, 2013, 780 pp.
Leutenegger et al., "Keyframe-based visual-inertial odometry using nonlinear optimization," The International Journal of Robotics Research, vol. 34, No. 3, Mar. 2015, pp. 314-334.
Li et al., "Optimization-Based Estimator Design for Vision-Aided Inertial Navigation," Proceedings of the Robotics: Science and Systems Conference, Jul. 9-13, 2012, 8 pp.

(56) References Cited

OTHER PUBLICATIONS

Mourikis et al., "A Dual-Layer Estimator Architecture for Long-term Localization," Proceedings of the Workshop on Visual Localization for Mobile Platforms, Jun. 24-26, 2008, 8 pp.

Nerurkar et al., "C-KLAM: Constrained Keyframe-Based Localization and Mapping," Proceedings of the IEEE International Conference on Robotics and Automation, May 31-Jun. 7, 2014, 6 pp.

"Project Tango," retrieved from http://www.google.com/atap/projecttango on Nov. 2, 2015, 4 pp.

Triggs et al., "Bundle Adjustment—A Modern Synthesis," Proceedings of the International Workshop on Vision Algorithms: Theory and Practice, Lecture Notes in Computer Science, vol. 1883, Sep. 21-22, 1999, pp. 298-372.

U.S. Appl. No. 14/796,574, by Stergios I. Roumeliotis et al., filed Jul. 10, 2015.

U.S. Appl. No. 14/733,468, by Stergios I. Roumeliotis et al., filed Jun. 8, 2015.

Perea et al., "Sliding Windows and Persistence: An Application of Topological Methods to Signal Analysis," Foundations of Computational Mathematics, Nov. 25, 2013, 34 pp.

U.S. Appl. No. 15/706,149, filed Sep. 15, 2017, by Stergios I. Roumeliotis.

Kottas et al., "An Iterative Kalman Smoother for Robust 3D Localization and mapping," ISRR, Tech Report, Oct. 16, 2014, 15 pp.

Kottas et al., "An Iterative Kalman Smoother for Robust 3D Localization on Mobile and Wearable devices," Submitted confidentially to International Conference on Robotics & Automation, ICRA '15, May 5, 2015, 8 pp.

Agarwal et al., "A Survey of Geodetic Approaches to Mapping and the Relationship to Graph-Based SLAM," IEEE Robotics and Automation Magazine, vol. 31, Sep. 2014, 17 pp.

U.S. Appl. No. 15/601,261, by Stergios I. Roumeliotis, filed May 22, 2017.

U.S. Appl. No. 15/130,736, by Stergios I. Roumeliotis, filed Apr. 15, 2016.

U.S. Appl. 15/605,448, by Stergios I. Roumeliotis, filed May 25, 2017.

U.S. Appl. No. 15/470,595, by Stergios I. Roumeliotis, filed Mar. 27, 2017.

Mourikis et al., "A Multi-State Constraint Kalman Filter for Vision-aided Inertial Navigation," IEEE International Conference on Robotics and Automation, dated Sep. 28, 2006, 20 pp.

Guo et al., "Resource-Aware Large-Scale Cooperative 3D Mapping from Multiple Cell Phones," Multiple Autonomous Robotic Systems (MARS) Lab, ICRA Poster May 26-31, 2015, 1 pp.

Guo et al., "Efficient Visual-Inertial Navigation using a Rolling-Shutter Camera with Inaccurate Timestamps," Proceedings of Robotics: Science and Systems, Jul. 2014, 9 pp.

Kottas et al., "A Resource-aware Vision-aided Inertial Navigation System for Wearable and Portable Computers," IEEE International Conference on Robotics and Automation, Accepted Apr. 18, 2014, available online May 6, 2014, 3 pp.

Latif et al., "Applying Sparse '1-Optimization to Problems in Robotics," ICRA 2014 Workshop on Long Term Autonomy, Jun. 2014, 3 pp.

Lee et al., "Pose Graph-Based RGB-D SLAM in Low Dynamic Environments," ICRA Workshop on Long Term Autonomy, 2014, (Applicant points out, in accordance with MPEP 609.04(a), that the year of publication, 2014, is sufficiently earlier than the effective U.S. filing date, 2017, so that the particular month of publication is not in issue.) 19 pp.

Taylor et al., "Parameterless Automatic Extrinsic Calibration of Vehicle Mounted Lidar-Camera Systems," Conference Paper, Mar. 2014, 4 pp.

Guo et al., "Resource-Aware Large-Scale Cooperative 3D Mapping from Multiple Cell Phones," Poster submitted to The International Robotics and Automation Conference, May 26-31, 2015, 1 pp.

Golub et al., "Matrix Multiplication Problems," Chapter 1, Matrix Computations, Third Edition, ISBN 0-8018-5413-X, 1996, (Applicant points out, in accordance with MPEP 609.04(a), that the year of publication, 1996, is sufficiently earlier than the effective U.S. filing date, so that the particular month of publication is not in issue.) 47 pp.

"Kalman filter," Wikipedia, the Free Encyclopedia, accessed from https://en.wikipedia.org/w/index.php?title=Kalman_filter&oldid=615383582, drafted Jul. 3, 2014, 27 pp.

Thorton et al., "Triangular Covariance Factorizations for Kalman Filtering," Technical Memorandum 33-798, National Aeronautics and Space Administration, Oct. 15, 1976, 212 pp.

Shalom et al., "Estimation with Applications to Tracking and Navigation," Chapter 7, Estimation with Applications to Tracking and Navigation, ISBN 0-471-41655-X, Jul. 2001, 20 pp.

Higham, "Matrix Inversion," Chapter 14, Accuracy and Stability of Numerical Algorithms, Second Edition, ISBN 0-89871-521-0, 2002, 29 pp. (Applicant points out, in accordance with MPEP 609.04(a), that the year of publication, 2002, is sufficiently earlier than the effective U.S. filing date, so that the particular month of publication is not in issue.).

\* cited by examiner

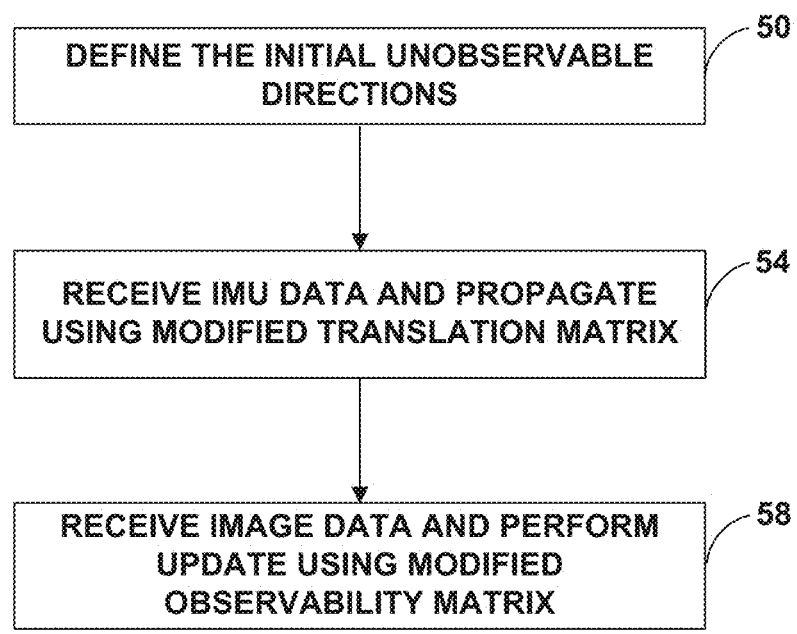
FIG. 1.1

EXTRINSIC PARAMETER CALIBRATION OF A VISION-AIDED INERTIAL NAVIGATION SYSTEM

This application is a national stage entry under 35 U.S.C. § 371 of International Application No. PCT/US2014/017773, filed Feb. 21, 2014, which claims the benefit of U.S. Provisional Patent Application No. 61/767,691, filed Feb. 21, 2013 and U.S. Provisional Patent Application No. 61/767,701, filed Feb. 21, 2013, the entire content of each being incorporated herein by reference.

TECHNICAL FIELD

This disclosure relates to navigation and, more particularly, to vision-aided inertial navigation.

BACKGROUND

In general, a Vision-aided Inertial Navigation System (VINS) fuses data from a camera and an Inertial Measurement Unit (IMU) to track the six-degrees-of-freedom (d.o.f.) position and orientation (pose) of a sensing platform. In this way, the VINS combines complementary sensing capabilities. For example, an IMU can accurately track dynamic motions over short time durations, while visual data can be used to estimate the pose displacement (up to scale) between consecutive views. For several reasons, VINS has gained popularity within the robotics community as a method to address GPS-denied navigation.

SUMMARY

In general, this disclosure describes various techniques for use within a vision-aided inertial navigation system (VINS). Examples include state initialization, calibration, synchronization, feature detection, detecting and dealing with hovering conditions, In one example, this disclosure describes techniques for reducing or eliminating estimator inconsistency in vision-aided inertial navigation systems (VINS). It is recognized herein that a significant cause of inconsistency can be gain of spurious information along unobservable directions, resulting in smaller uncertainties, larger estimation errors, and divergence. An Observability-Constrained VINS (OC-VINS) is described herein, which may enforce the unobservable directions of the system, hence preventing spurious information gain and reducing inconsistency.

As used herein, an unobservable direction refers to a direction along which perturbations of the state cannot be detected from the input data provided by the sensors of the VINS. That is, an unobservable direction refers to a direction along which changes to the state of the VINS relative to one or more feature may be undetectable from the input data received from at least some of the sensors of the sensing platform. As one example, a rotation of the sensing system around a gravity vector may be undetectable from the input of a camera of the sensing system when feature rotation is coincident with the rotation of the sensing system. Similarly, translation of the sensing system may be undetectable when observed features are identically translated.

In another example, techniques are described by which an estimator of a vision-aided inertial navigation system (VINS) estimates calibration parameters that specify a relative orientation and position of an image source with respect to an inertial measurement unit (IMU) using an external calibration target that need may not be aligned to gravity.

The VINS may, for example, comprise an image source to produce image data comprising a plurality of images, and an IMU to produce IMU data indicative of a motion of the vision-aided inertial navigation system while producing the image data, wherein the image data captures features of the external calibration target that is not aligned with gravity. The VINS further includes a processing unit comprising an estimator that processes the IMU data and the image data to compute calibration parameters for the VINS concurrently with computation of estimates for a roll and a pitch of the calibration target, wherein the calibration parameters define relative positions and orientations of the IMU and the image source of the vision-aided inertial navigation system.

The techniques described herein are applicable to several variants of VINS, such as Visual Simultaneous Localization and Mapping (V-SLAM) as well as visual-inertial odometry using the Multi-state Constraint Kalman Filter (MSC-KF) or an inverse filter operating on a subset of or all image and IMU data. The proposed techniques for reducing inconsistency are extensively validated with simulation trials and real-world experimentation.

The 3D inertial navigation techniques may computes state estimates based on a variety of captured features, such as points, lines, planes or geometric shapes based on combinations thereof, such as crosses (i.e., perpendicular, intersecting line segments), sets of parallel line segments, and the like.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 1.1 is a flowchart illustrating an example operation of estimator applying the techniques described here.

FIG. 2(c) illustrate camera-IMU trajectory and 3D features. FIG. (f) illustrates error and 3σ bounds for the rotation about the gravity vector, plotted for the first 100 sec of a representative run.

FIG. 5(a) is a plot illustrating projection on the x and y axis. FIG. 5(b) is a plot illustrating projection on the y and z axis. FIG. 5(c) is a plot illustrating 3D view of the overall trajectory and the estimated features.

FIG. 9(*a*) illustrates an outdoor experimental trajectory covering 1.5 km across the University of Minnesota campus. The red (blue) line denotes the OC-MSC-KF (Std-MSC-KF) estimated trajectory. The green circles denote a low-quality GPS-based estimate of the position across the trajectory. FIG. 9(*b*) illustrates a zoom-in view of the beginning/end of the run. Both filters start with the same initial pose estimate, however, the error for the Std-MSC-KF at the end of the run is 10:97 m, while for the OC-MSC-KF the final error is 4:38 m (an improvement of approx. 60%). Furthermore, the final error for the OC-MSC-KF is approximately 0:3% of the distance traveled. FIG. 9(*c*) illustrates a zoomed-in view of the turn-around point. The Std-MSC-KF trajectory is shifted compared to the OC-MSC-KF, which remains on the path (light-brown region).

FIG. 10(*a*) illustrates position uncertainty along the x-axis (perpendicular to the direction of motion) for the Std-MSC-KF, and OC-MSC-KF respectively. FIG. 10(*b*) illustrates orientation uncertainty about the vertical axis (z).

DETAILED DESCRIPTION

Figure 1:
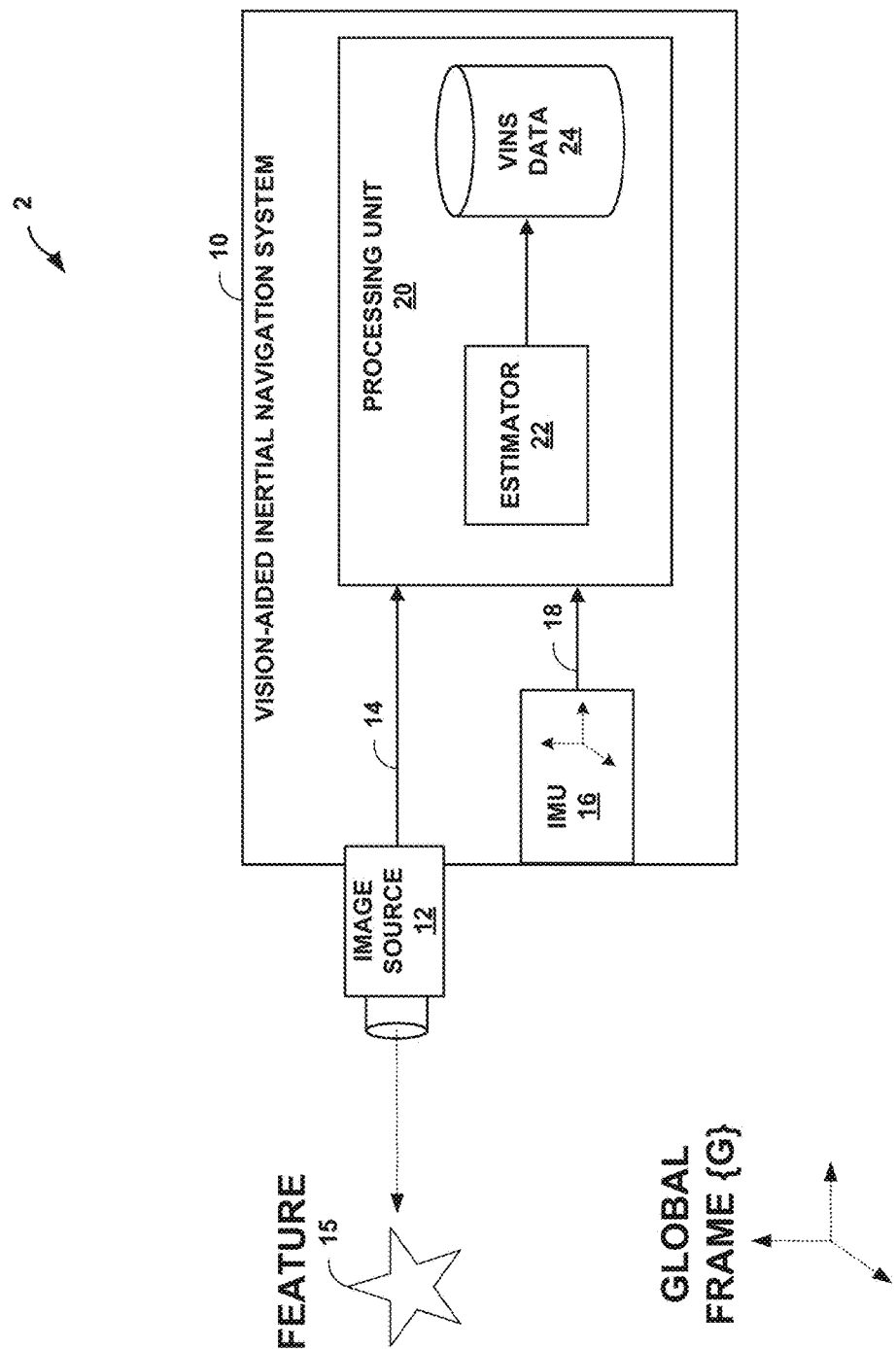
FIG. 1 is a block diagram illustrating a sensor platform comprising an IMU and a camera.

Estimator inconsistency can greatly affect vision-aided inertial navigation systems (VINS). As generally defined in, a state estimator is "consistent" if the estimation errors are zero-mean and have covariance smaller than or equal to the one calculated by the filter. Estimator inconsistency can have a devastating effect, particularly in navigation applications, since both the current pose estimate and its uncertainty, must be accurate in order to address tasks that depend on the localization solution, such as path planning. For nonlinear systems, several potential sources of inconsistency exist (e.g., motion-model mismatch in target tracking), and great care must be taken when designing an estimator to improve consistency.

Techniques for estimation are described that reduces or prohibits estimator inconsistency. For example, the estimation techniques may eliminate inconsistency due to spurious information gain which arises from approximations incurred when applying linear estimation tools to nonlinear problems (i.e., when using linearized estimators such as the extended Kalman Filter (EKF)).

For example, the structure of the "true" and estimated systems are described below and it is shown that for the true system four unobservable directions exist (i.e., 3-d.o.f. global translation and 1-d.o.f. rotation about the gravity vector), while the system employed for estimation purposes has only three unobservable directions (3-d.o.f. global translation). Further, it is recognized herein that a significant source of inconsistency in VINS is spurious information gained when orientation information is incorrectly projected along the direction corresponding to rotations about the gravity vector. An elegant and powerful estimator modification is described that reduces or explicitly prohibits this incorrect information gain. An estimator may, in accordance with the techniques described herein, apply a constrained estimation algorithm that computes the state estimates based on the IMU data and the image data while preventing projection of information from the image data and IMU data along at least one of the unobservable degrees of freedom, e.g., along the gravity vector. The techniques described herein may be applied in a variety of VINS domains (e.g., V-SLAM and the MSC-KF) when linearized estimators, such as the EKF, are used.

As used herein, an unobservable direction refers to a direction along which perturbations of the state cannot be detected from the input data provided by the sensors of the VINS. That is, an unobservable direction refers to a direction along which changes to the state of the VINS relative to one or more feature may be undetectable from the input data received from at least some of the sensors of the sensing platform. As one example, a rotation of the sensing system around a gravity vector may be undetectable from the input of a camera of the sensing system when feature rotation is coincident with the rotation of the sensing system. Similarly, translation of the sensing system may be undetectable when observed features are identically translated.

In one example, the observability properties of a linearized VINS model (i.e., the one whose Jacobians are evaluated at the true states) are described, and it is shown that such a model has four unobservable d.o.f., corresponding to three-d.o.f. global translations and one-d.o.f. global rotation about the gravity vector. Moreover, it is shown that when the estimated states are used for evaluating the Jacobians, as is the case for the EKF, the number of unobservable directions is reduced by one. In particular, the global rotation about the gravity vector becomes (erroneously) observable, allowing the estimator to gain spurious information and leading to inconsistency. These results confirm the findings of using a different approach (i.e., the observability matrix), while additionally specifying the exact mathematical structure of the unobservable directions necessary for assessing the EKF's inconsistency.

To address these problems, modifications of the VINS EKF is described herein where, in one example, estimated Jacobians are updated so as to ensure that the number of unobservable directions is the same as when using the true Jacobians. In this manner, the global rotation about the gravity vector remains unobservable and the consistency of the VINS EKF is significantly improved.

Simulations and experimental results are described that demonstrate inconsistency in standard VINS approaches as well as validate the techniques described herein to show that the techniques improve consistency and reduce estimation errors as compared to conventional VINS. In addition, performance of the described techniques is illustrated experimentally using a miniature IMU and a small-size camera.

This disclosure describes example systems and measurement models, followed by analysis of VINS inconsistency.

The proposed estimator modification are presented and subsequently validated both in simulations and experimentally.

VINS Estimator Description

An overview of the propagation and measurement models which govern the VINS is described. In one example, an EKF is employed for fusing the camera and IMU measurements to estimate the state of the system including the pose, velocity, and IMU biases, as well as the 3D positions of visual landmarks observed by the camera. One example utilizes two types of visual features in a VINS framework. The first are opportunistic features (OFs) that can be accurately and efficiently tracked across short image sequences (e.g., using KLT), but are not visually distinctive enough to be efficiently recognized when revisiting an area. OFs can be efficiently used to estimate the motion of the camera over short time horizons (i.e., using the MSC-KF), but they are not included in the state vector. The second are Persistent Features (PFs), which are typically much fewer in number, and can be reliably redetected when revisiting an area (e.g., SIFT keys). 3D coordinates of the PFs (e.g., identified points, lines, planes, or geometric shapes based on combinations thereof) are estimated and may be recorded, e.g., into a database, to construct a map of the area or environment in which the VINS is operating.

System State and Propagation Model

FIG. 1 is a block diagram illustrating a vision-aided inertial navigation system (VINS) 10 comprises an image source 12 and an inertial measurement unit (IMU) 14. Image source images an environment in which VINS 10 operates so as to produce image data 14. That is, image source 12 provides image data 14 that captures a number of features visible in the environment. Image source 12 may be, for example, one or more cameras that capture 2D or 3D images, a laser scanner or other optical device that produces a stream of 1D image data, a depth sensor that produces image data indicative of ranges for features within the environment, a stereo vision system having multiple cameras to produce 3D information, and the like.

IMU 16 produces IMU data 18 indicative of a dynamic motion of VINS 10. IMU 14 may, for example, detect a current rate of acceleration using one or more accelerometers as VINS 10 is translated, and detect changes in rotational attributes like pitch, roll and yaw using one or more gyroscopes. IMU 14 produces IMU data 18 to specify the detected motion. Estimator 22 of processing unit 20 process image data 14 and IMU data 18 to compute state estimates for the degrees of freedom of VINS 10 and, from the state estimates, computes position, orientation, speed, locations of observable features, a localized map, an odometry or other higher order derivative information represented by VINS data 24.

In this example, $\{I_{-qG}, G_{PI}\}$ are the quaternion of orientation and position vector describing the pose of the sensing IMU frame $\{I\}$ with respect to the global frame $\{G\}$. The i-th feature's 3D coordinates are denoted as $G_{fi}$ and $I_{fi}$ with respect to $\{I\}$ and $\{G\}$, respectively.

In one example, estimator 22 comprises an EKF that estimates the 3D IMU pose and linear velocity together with the time-varying IMU biases and a map of visual features 15. In one example, the filter state is the (16+3N)×1 vector:

$$x = \begin{bmatrix} I-T \\ qG \end{bmatrix} \quad b_g^T \quad GV_I^T \quad b_a^T \quad GP_I^T | Gf_1^T \quad \ldots \quad Gf_N^T \end{bmatrix}^T \quad (1)$$

$$= [X_S^T | X_f^T]^T$$

where $x_s(t)$ is the 16×1 state of VINS 10, and $x_f(t)$ is the 3N×1 state of the feature map. The first component of the state of VINS 10 is $^{-I}q_G(t)$ which is the unit quaternion representing the orientation of the global frame $\{G\}$ in the IMU frame, $\{I\}$, at time t. The frame $\{I\}$ is attached to the IMU, while $\{G\}$ is a local-vertical reference frame whose origin coincides with the initial IMU position. The state of VINS 10 also includes the position and velocity of $\{I\}$ in $\{G\}$, denoted by the 3×1 vectors $^G p_I(t)$ and $^G v_I(t)$, respectively. The remaining components are the biases, $b_g(t)$ and $b_a(t)$, affecting the gyroscope and accelerometer measurements, which are modeled as random-walk processes driven by the zero-mean, white Gaussian noise $n_{wg}(t)$ and $n_{wa}(t)$, respectively.

In one example, the map state, $x_f$, comprises the 3D coordinates of N PFs, $^G f_i$, i=1, . . . , N, and grows as new PFs are observed. In one implementation, the VINS does not store OFs in the map. Instead, processing unit 20 of VINS 10 processes and marginalizes all OFs in real-time using the MSC-KF approach. An example continuous-time model which governs the state of VINS 10.

An example system model describing the time evolution of the state and applied by estimator 22 is represented as:

$$^I\dot{q}_G(t) = \frac{1}{2}\Omega(\omega(t))^I q_G(t) \quad (2)$$

$$^G\dot{p}_I(t) = {}^G v_I(t) \quad (3)$$

$$^G\dot{v}_I(t) = {}^G a(t) \quad (4)$$

$$\dot{b}_g(t) = n_{wg}(t) \quad (5)$$

$$\dot{b}_a(t) = n_{wa}(t) \quad (6)$$

$$^G\dot{f}_i(t) = 0_{3\times 1}, i = 1, \ldots, N. \quad (7)$$

In these expressions, $\omega(t)=[\omega_1(t) \ \omega_2(t) \ \omega_3(t)]^T$ is the rotational velocity of the IMU, expressed in $\{I\}$, $^G a$ is the IMU acceleration expressed in $\{G\}$, and $$\Omega(\omega) = \begin{bmatrix} -\lfloor\omega X\rfloor & \omega \\ -\omega^T & 0 \end{bmatrix}, \lfloor\omega X\rfloor \triangleq \begin{bmatrix} 0 & -\omega_3 & \omega_2 \\ \omega_3 & 0 & -\omega_1 \\ -\omega_2 & \omega_1 & 0 \end{bmatrix}.$$

The gyroscope and accelerometer measurements, $\omega_m$ and $a_m$, are modeled as $$\omega_m(t)=\omega(t)+b_g(t)+n_g(t)$$

$$a_m(t)=C(^{-I}q_G(t))(^G a(t)-{}^G g)+b_a(t)+n_a(t),$$

where $n_g$ and $n_a$ are zero-mean, white Gaussian noise processes, and $^G g$ is the gravitational acceleration. The matrix $C^-(q)$ is the rotation matrix corresponding to q. The PFs belong to the static scene, thus, their time derivatives are zero.

Linearizing at the current estimates and applying the expectation operator on both sides of (2)-(7), the state estimate propagation model is obtained as:

$$^I\dot{\hat{q}}_G(t) = \frac{1}{2}\Omega(\hat{\omega}(t))^I \hat{q}_G(t) \quad (10)$$

$$^G\dot{\hat{p}}_I(t) = {}^G\hat{v}_I(t) \quad (11)$$

-continued $$^{G}\dot{v}_I(t) = C^T(^{I}_{\ G}q(t))\hat{a}(t) + {}^{G}g \quad (12)$$

$$\dot{\bar{b}}_g(t) = 0_{3\times 1} \quad (13)$$

$$\dot{\bar{b}}_a(t) = 0_{3\times 1} \quad (14)$$

$$^{G}\dot{f}_i(t) = 0_{3\times 1}, i = 1, \ldots, N, \quad (15)$$

where $\hat{a}(t) = a_m(t) - \hat{b}_a(t)$, and $\hat{\omega}(t) = \omega_m(t) - \hat{b}_g(t)$.

The $(15+3N) \times 1$ error-state vector is defined as $$\tilde{X} = \begin{bmatrix} I\delta\theta_G^T & \tilde{b}_g^T & {}^G\tilde{v}_I^T & \tilde{b}_a^T & {}^G\tilde{p}_I^T \mid {}^G\tilde{f}_1^T & \ldots & {}^G\tilde{f}_N^T \end{bmatrix}^T \quad (16)$$

$$= \begin{bmatrix} \tilde{X}_S^T \mid \tilde{X}_f^T \end{bmatrix}^T,$$

where $x_s(t)$ is the 15×1 error state corresponding to the sensing platform, and $x_f(t)$ is the 3N×1 error state of the map. For the IMU position, velocity, biases, and the map, an additive error model is utilized (i.e., $\tilde{x} = x - \hat{x}$ is the error in the estimate $\hat{x}$ of a quantity $x$). However, for the quaternion a multiplicative error model is employed. Specifically, the error between the quaternion $q$ and its estimate $\hat{q}$ is the 3×1 angle-error vector, $\delta\Theta$, implicitly defined by the error quaternion:

$$\delta\bar{q} = \bar{q} \otimes \hat{\bar{q}}^{-1} \simeq \begin{bmatrix} \frac{1}{2}\delta\theta^T & 1 \end{bmatrix}^T, \quad (17)$$

where $\delta\bar{q}$ describes the small rotation that causes the true and estimated attitude to coincide. This allows the attitude uncertainty to be represented by the 3×3 covariance matrix $E[\delta\Theta\delta\Theta^T]$, which is a minimal representation.

The linearized continuous-time error-state equation is $$\dot{\tilde{X}} = \begin{bmatrix} F_S & 0_{15\times 3N} \\ 0_{3N\times 15} & 0_{3N} \end{bmatrix}\tilde{x} + \begin{bmatrix} G_S \\ 0_{3N\times 12} \end{bmatrix}n \quad (18)$$

$$= F\tilde{x} + Gn,$$

where $0_{3N}$ denotes the 3N×3N matrix of zeros. Here, $n$ is the vector comprising the IMU measurement noise terms as well as the process noise driving the IMU biases, i.e., $$n = [n_g^T n_{wg}^T n_a^T n_{wa}^T]^T, \quad (19)$$

while $F_s$ is the continuous-time error-state transition matrix corresponding to the state of VINS 10, and $G_s$ is the continuous-time input noise matrix, i.e., $$F_s = \begin{bmatrix} -\lfloor\hat{\omega}x\rfloor & -I_3 & 0_3 & 0_3 & 0_3 \\ 0_3 & 0_3 & 0_3 & 0_3 & 0_3 \\ -C^T(^{I}_{\ G}\bar{q})\lfloor\hat{a}x\rfloor & 0_3 & 0_3 & -C^T(^{I}_{\ G}\bar{q}) & 0_3 \\ 0_3 & 0_3 & 0_3 & 0_3 & 0_3 \\ 0_3 & 0_3 & I_3 & 0_3 & 0_3 \end{bmatrix} \quad (20)$$

$$G_s = \begin{bmatrix} -I_3 & 0_3 & 0_3 & 0_3 \\ 0_3 & I_3 & 0_3 & 0_3 \\ 0_3 & 0_3 & -C^T(^{I}_{\ G}\bar{q}) & 0_3 \\ 0_3 & 0_3 & 0_3 & I_3 \\ 0_3 & 0_3 & 0_3 & 0_3 \end{bmatrix} \quad (21)$$

where $I_3$ is the 3×3 identity matrix. The system noise is modeled as a zero-mean white Gaussian process with autocorrelation $E[n(t)n^T(\tau)] = Q_c\delta(t-\tau)$, where $Q_c$ depends on the IMU noise characteristics and is computed off-line.

Discrete-Time Implementation

The IMU signals $\omega_m$ and $a_m$ are sampled by processing unit 20 at a constant rate $1/\delta t$, where $\delta t \triangleq t_{k+1} - t_k$. Upon receiving a new IMU measurement 18, the state estimate is propagated by estimator 22 using 4th-order Runge-Kutta numerical integration of (10)-(15). In order to derive the covariance propagation equation, the discrete-time state transition matrix, $\Phi_k$ is computed, and the discrete-time system noise covariance matrix, $Q_k$ is computed as $$\Phi_k = \Phi(t_{k+1}, t_k) = \exp\left(\int_{t_k}^{t_{k+1}} F(\tau)d\tau\right) \quad (22)$$

$$Q_k = \int_{t_k}^{t_{k+1}} \Phi(t_{k+1}, \tau)GQ_cG^T\Phi^T(t_{k+1}, \tau)d\tau.$$

The covariance is then propagated as:

$$P_{k+1|k} = \Phi_k P_{k|k}\Phi_k^T + Q_k. \quad (23)$$

In the above expression, and throughout this disclosure, $P_{i|j}$ and $\hat{x}_{i|j}$ are used to denote the estimates of the error-state covariance and state, respectively, at time-step $i$ computed using measurements up to time-step $j$.

Measurement Update Model

As VINS 10 moves, image source observes both opportunistic and persistent visual features. These measurements are utilized to concurrently estimate the motion of the sensing platform (VINS 10) and the map of PFs. In one implementation, three types of filter updates are distinguished: (i) PF updates of features already in the map, (ii) initialization of PFs not yet in the map, and (iii) OF updates. The feature measurement model is described how the model can be employed in each case.

To simplify the discussion, the observation of a single PF point $f_i$ is considered. The image source measures $z_i$, which is the perspective projection of the 3D point $^If_i$, expressed in the current IMU frame $\{I\}$, onto the image plane, i.e., $$z_i = \frac{1}{z}\begin{bmatrix} x \\ y \end{bmatrix} + \eta_i \quad (24)$$

where $$\begin{bmatrix} x \\ y \\ z \end{bmatrix} = {}^If_i = C(^{I}_{\ G}\bar{q})({}^Gf - {}^Gp_{I_i}). \quad (25)$$

Without loss of generality, the image measurement is expressed in normalized pixel coordinates, and the camera frame is considered to be coincident with the IMU. Both intrinsic and extrinsic IMU-camera calibration can be performed off-line.

The measurement noise, $\eta_i$, is modeled as zero mean, white Gaussian with covariance $R_i$. The linearized error model is:

$$\tilde{z}_i = z_i - \hat{z}_i = \tilde{H}_i\tilde{x} + \eta_i \quad (26)$$

where $\hat{z}$ is the expected measurement computed by evaluating (25) at the current state estimate, and the measurement Jacobian, $H_i$, is $$H_i = H_c[H_q 0_{3\times 9} H_p | 0_3 \ldots H_{f_i} \ldots 0_3] \tag{27}$$

with $$H_c = \frac{1}{z^2}\begin{bmatrix} z & 0 & -x \\ 0 & z & -y \end{bmatrix} \tag{28}$$

$$H_q = \lfloor C(I_q G)(G_{f_i} - G_{P_I}) \times \rfloor \tag{29}$$

$$H_p = -C(I_q G) \tag{30}$$

$$H_{f_i} = C(I_q G). \tag{31}$$

evaluated at the current state estimate. Here, $H_c$, is the Jacobian of the camera's perspective projection with respect to ${}^I f_i$, while $H_q$, $H_p$, and $H_{f_i}$ are the Jacobians of ${}^I f_i$ with respect to ${}^I q_G$, ${}^G p_I$, and ${}^G f_i$.

This measurement model is utilized in each of the three update methods. For PFs that are already in the map, the measurement model (25)-(27) is directly applied to update the filter. In particular, the measurement residual $r_i$ is computed along with its covariance $S_i$, and the Kalman gain $K_i$, i.e., $$r_i = z_i - \hat{z}_i \tag{32}$$

$$S_i = H_i P_{k+1|k} H_i^T + R_i \tag{33}$$

$$K_i = P_{k+1|k} H_i^T S_i^{-1}. \tag{34}$$

and update the EKF state and covariance as $$\hat{x}_{k+1|k+1} \triangleq \hat{x}_{k+1|k} + K_i r_i \tag{35}$$

$$P_{k+1|k+1} P_{k+1|k} - P_{k+1|k} H_i^T S_i^{-1} H_i P_{k+1|k} \tag{36}$$

For previously unseen (new) PFs, compute an initial estimate is computed, along with covariance and cross-correlations by solving a bundle-adjustment problem over a short time window. Finally, for OFs, the MSC-KF is employed to impose an efficient (linear complexity) pose update constraining all the views from which a set of features was seen.

VINS Observability Analysis

In this section, the observability properties of the linearized VINS model are examined Specifically, the four unobservable directions of the ideal linearized VINS are analytically determined (i.e., the system whose Jacobians are evaluated at the true states). Subsequently, the linearized VINS used by the EKF, whose Jacobians are evaluated using the current state estimates, are shown to have only three unobservable directions (i.e., the ones corresponding to global translation), while the one corresponding to global rotation about the gravity vector becomes (erroneously) observable. The findings of this analysis are then employed to improve the consistency of the EKF-based VINS.

Observability Analysis of the Ideal Linearized VINS Model

An observability matrix is defined as a function of the linearized measurement model, H, and the discrete-time state transition matrix, $\Phi$, which are in turn functions of the linearization point, $x^*$, i.e., $$M(x^*) = \begin{bmatrix} H_1 \\ H_2 \Phi_{2,1} \\ \vdots \\ H_k \Phi_{k,1} \end{bmatrix} \tag{37}$$

where $\Phi_{k,1} = \Phi_{k-1} \ldots \Phi_1$ is the state transition matrix from time step 1 to k. First, consider the case where the true state values are used as linearization point $x^*$ for evaluating the system and measurement Jacobians. The case where only a single feature point is visible is discussed. The case of multiple features can be easily captured by appropriately augmenting the corresponding matrices. Also, the derived nullspace directions remain the same, in terms of the number, with an identity matrix $(-\lfloor {}^G f_i \times \rfloor {}^G g)$ appended to the ones corresponding to global translation (rotation) for each new feature. The first block-row of M is written as (for k=1):

$$H_k = \Psi_1 [\Psi_2 0_3 0_3 0_3 -I_3 I_3] \tag{38}$$

where $$\Psi_1 = H_{c,k} C({}^{I_k} q_G) \tag{39}$$

$$\Psi_2 = \lfloor {}^G f - {}^G p_{I_k} \times \rfloor C({}^{I_k} q_G)^T \tag{40}$$

and ${}^{I_k} q_G$ denotes the rotation of $\{G\}$ with respect to frame $\{I_k\}$ at time step k=1.

To compute the remaining block rows of the observability matrix, $\Phi_{k,1}$ is determined analytically by solving the matrix differential equation:

$$\dot{\Phi}_{k,1} = F \Phi_{k,1}, \text{ i.c. } \Phi_{1,1} = I_{18}. \tag{41}$$

with F detailed in (18). The solution has the following structure $$\Phi_{k,1} = \begin{bmatrix} \Phi_{11} & \Phi_{12} & 0_3 & 0_3 & 0_3 & 0_3 \\ 0_3 & I_3 & 0_3 & 0_3 & 0_3 & 0_3 \\ \Phi_{31} & \Phi_{32} & I_3 & \Phi_{34} & 0_3 & 0_3 \\ 0_3 & 0_3 & 0_3 & I_3 & 0_3 & 0_3 \\ \Phi_{51} & \Phi_{52} & \delta t(k-1)I_3 & \Phi_{54} & I_3 & 0_3 \\ 0_3 & 0_3 & 0_3 & 0_3 & 0_3 & I_3 \end{bmatrix} \tag{42}$$

where among the different block elements $\Phi_{ij}$, the ones necessary in the analysis are listed below:

$$\Phi_{11} = C({}^{I_k} q_{I_1}) \tag{43}$$

$$\Phi_{31} = -\lfloor ({}^G v_{I_k} - {}^G v_{I_1}) + {}^G g(k-1)\delta t \times \rfloor C({}^G q_{I_1}) \tag{44}$$

$$\Phi_{51} = \left\lfloor {}^G p_{I_1} + {}^G v_{I_1}(k-1)\delta t - \frac{1}{2}{}^G g((k-1)\delta t)^2 - {}^G p_{I_k} \times \right\rfloor C({}^G q_{I_1}) \tag{45}$$

By multiplying (38) at time-step k and (42), the k-th block row of M is obtained, for k>1:

$$M_k = H_k \Phi_{k,1} = \Gamma_1 [\Gamma_2 \Gamma_3 - \delta t(k-1) I_3 \Gamma_4 - I_3 I_3] \tag{46}$$

where $$\Gamma_1 = H_{c,k} C({}^{I_k} q_G) \tag{47}$$

-continued $$\Gamma_2 = \left\lfloor {}^G f - {}^G p_{I_1} - {}^G v_{I_1}(k-1)\delta t + \frac{1}{2}{}^G g((k-1)\delta t)^2 \times \right\rfloor \cdot C({}^{I_1} q_G)^T \quad (48)$$

$$\Gamma_3 = \lfloor {}^G f - {}^G p_{I_k} \times \rfloor C^T({}^{I_k} q_G) \Phi_{12} - \Phi_{52} \quad (49)$$

$$\Gamma_4 = -\Phi_{54} \quad (50)$$

One primary result of the analysis is: the right nullspace $N_1$ of the observability matrix $M(x)$ of the linearized VINS $$M(x)/N_1 = 0 \quad (51)$$

spans the following four directions:

$$N_1 = \begin{bmatrix} 0_3 & C(I_{1_{qG}}) & G_g \\ 0_3 & 0_3 & \\ 0_3 & -\lfloor G_{V_{I_1}} \times \rfloor & G_g \\ & 0_3 & 0_3 \\ I_3 & -\lfloor G_{P_{I_1}} \times \rfloor & G_g \\ I_3 & -\lfloor G_f \times \rfloor & G_g \end{bmatrix} = [N_{t,1} | N_{r,1}] \quad (52)$$

For example, the fact that $N_1$ is indeed the right nullspace of $M(x)$ can be verified by multiplying each block row of M [see (46)] with $N_{t,1}$ and $N_{r,1}$ in (52). Since $M_k N_{t,1} = 0$ and $M_k N_{r,1} = 0$, it follows that $MN_1 = 0$. The 18×3 block column $N_{t,1}$ corresponds to global translations, i.e., translating both the sensing platform and the landmark by the same amount. The 18×1 column $N_{r,1}$ corresponds to global rotations of the sensing platform and the landmark about the gravity vector.

Observability Analysis of the EKF Linearized VINS Model

Ideally, any VINS estimator should employ a linearized system with an unobservable subspace that matches the true unobservable directions (52), both in number and structure. However, when linearizing about the estimated state ˆx, $M = M(ˆx)$ gains rank due to errors in the state estimates across time. In particular, the last two block columns of $M_k$ in (46) remain the same when computing $M_k = H_k \Phi_{k,1}$ from the Jacobians $H_k$ and $\Phi_{k,1}$ evaluated at the current state estimates and thus the global translation remains unobservable. In contrast, the rest of the block elements of (46), and specifically $\Gamma_2$ do not adhere to the structure shown in (48) and as a result the rank of the observability matrix $\hat{M}$ corresponding to the EKF linearized VINS model increases by one. In particular, it can be easily verified that the right nullspace $\hat{N}_1$ of $\hat{M}$ does not contain the direction corresponding to the global rotation about the g vector, which becomes (erroneously) observable. This, in turn, causes the EKF estimator to become inconsistent. The following describes techniques for addressing this issue.

OC-VINS: Algorithm Description

FIG. 1.1 is a flowchart illustrating an example operation of estimator 22 applying the techniques described here. Although illustrated for purposes of example as sequential, the steps of the flowchart may be performed concurrently. Initially, estimator 22 defines the initial unobservable directions, e.g., computes an initial nullspace from (eq. 55) for the particular system (STEP 50). In one example, the unobservable degrees of freedom comprise translations in horizontal and vertical directions and a rotation about a gravity vector. In another example, such as described in further detail in the Appendix below with respect to use of line features, other degrees of freedom may be unobservable.

Estimator 22 receives IMU data 18 and, based on the IMU data 18, performs propagation by computing updated state estimates and propagating the covariance. At this time, estimator 22 utilizes a modified state transition matrix to prevent correction of the state estimates along at least one of the unobservable degrees of freedom (STEP 54). In addition, estimator 22 receives image data 14 and updates the state estimates and covariance based on the image data. At this time, estimator 22 uses a modified observability matrix to similarly prevent correction of the state estimates along at least one of the unobservable degrees of freedom (STEP 58). In this example implementation, estimator 22 enforces the unobservable directions of the system, thereby preventing one or more unobservable directions from erroneously being treated as observable after estimation, thereby preventing spurious information gain and reducing inconsistency. In this way, processing unit 20 may more accurately compute state information for VINS 10, such as a pose of the vision-aided inertial navigation system, a velocity of the vision-aided inertial navigation system, a displacement of the vision-aided inertial navigation system based at least in part on the state estimates for the subset of the unobservable degrees of freedom without utilizing state estimates the at least one of the unobservable degrees of freedom.

An example algorithm is set forth below for implementing the techniques in reference to the equations described in further detail herein:

---

Initialization: Initialization: Compute initial nullspace from (55)
while running do
    Propagation:
        Integrate state equations
        Compute nullspace at current time-step from (56)
        Compute $\Phi_k$ from (22)
        Modify $\Phi_k$ using (60)-(62)
        Propagate covariance
    Update:
    for all observed features do
        Compute measurement Jacobian from (27)
        Modify H using (69)-(74)
        Apply filter updated
    end for
    New landmark initialization:
    for all new PFs observed do
        Initialize $G_{f_j}$
        Create nullspace block, $N_{f_j}$, for $G_{f_j}$
        Augment $N_k$ with the new sub-block $N_{f_j}$
    end for
end while

---

In order to address the EKF VINS inconsistency problem, it is ensured that (51) is satisfied for every block row of $\hat{M}$ when the state estimates are used for computing $\hat{H}_k$, and $\hat{\Phi}_{k,1}$, $\forall k > 0$, i.e., it is ensured that $$\hat{H}_k \hat{\Phi}_{k,1} \hat{N}_1 = 0, \forall k > 0. \quad (53)$$

One way to enforce this is by requiring that at each time step, $\hat{\Phi}_k$ and $\hat{H}_k$ satisfy the following constraints:

$$\hat{N}_{k+1} = \hat{\Phi}_k \hat{N}_k \quad (54a)$$

$$\hat{H}_k \hat{N}_k = 0, \forall k > 0 \quad (54b)$$

where $\hat{N}_k$, $k > 0$ is computed analytically (see (56)). This can be accomplished by appropriately modifying $\hat{\Phi}_k$ and $\hat{H}_k$.

In particular, rather than changing the linearization points explicitly, the nullspace, $\hat{N}_k$, is maintained at each time step, and used to enforce the unobservable directions. This has the benefit of allowing us to linearize with the most accurate state estimates, hence reducing the linearization error, while still explicitly adhering to the system observability properties.

Nullspace Initialization

The initial nullspace is analytically defined:

$$\hat{N}_1 = \begin{bmatrix} 0_3 & C(I_{\bar{q}_{G,0|0}}) & G_g \\ 0_3 & & 0_3 \\ 0_3 & -\lfloor G_{\hat{v}_{I,0|0}} \times \rfloor & G_g \\ & 0_3 & 0_3 \\ I_3 & -\lfloor G_{\hat{p}_{I,0|0}} \times \rfloor & G_g \\ I_3 & -\lfloor G_{\hat{f}_{I,0|0}} \times \rfloor & G_g \end{bmatrix} \quad (55)$$

At subsequent time steps, the nullspace is augmented to include sub-blocks corresponding to each new PF in the filter state, i.e., $$\hat{N}_k = \begin{bmatrix} 0_3 & C({}^I\bar{q}_{G,k|k-1}) & G_g \\ 0_3 & & 0_3 \\ 0_3 & -\lfloor {}^G\hat{v}_{N,k|k-\ell'} \times \rfloor & G_g \\ 0_3 & & 0_3 \\ I_3 & -\lfloor {}^G\hat{p}_{I,k|k-1} \times \rfloor & G_g \\ I_3 & -\lfloor {}^G\hat{f}_{1,k|k-\ell} \times \rfloor & G_g \\ \vdots & \vdots & \\ I_3 & -\lfloor {}^G\hat{f}_{N,k|k-\ell'} \times \rfloor & G_g \end{bmatrix}. \quad (56)$$

where the sub-blocks $\hat{N}_{F_i} = [I_3 - \lfloor G_{\hat{f}_{k|k-\ell}} \times \rfloor G_g]$, are the rows corresponding to the i-th feature in the map, which are a function of the feature estimate at the time-step when it was initialized (k−l).

Modification of the State Transition Matrix Φ

During the covariance propagation step, it is ensured that $\hat{N}_{k+1} = \hat{\Phi}_k \hat{N}_k$. Note, the constraint on $\hat{N}_{t,k}$ is automatically satisfied due to the structure of $\hat{\Phi}_k$, so we focus on $\hat{N}_{r,k}$. Note that due to the structure of the matrices $\Phi_k$ and $N_{r,k}$, the first five block elements of need only be considered while the equality for the remaining ones, i.e., the elements corresponding to the features, are automatically satisfied. Specifically, rewrite (54a) is rewritten element-wise as:

$$\hat{N}_{r,k+1} = \hat{\Phi}_k \hat{N}_{r,k} \Rightarrow \quad (57)$$

$$\begin{bmatrix} C(I_{\bar{q}_{G,k+1|k}}) G_g \\ -\lfloor G_{\hat{v}_{I,k+1|k}} \times \rfloor G_g \\ -\lfloor G_{\hat{p}_{I,k+1|k}} \times \rfloor G_g \end{bmatrix} = \quad (58)$$

$$\begin{bmatrix} \Phi_{11} & \Phi_{12} & 0_3 & 0_3 & 0_3 \\ 0_3 & I_3 & 0_3 & 0_3 & 0_3 \\ \hat{\Phi}_{31} & \hat{\Phi}_{32} & I_3 & \hat{\Phi}_{34} & 0_3 \\ 0_3 & 0_3 & 0_3 & I_3 & 0_3 \\ \hat{\Phi}_{51} & \hat{\Phi}_{52} & \delta t I_3 & \hat{\Phi}_{54} & I_3 \end{bmatrix} \cdot \begin{bmatrix} C(I_{\bar{q}_{G,k|k-1}}) G_g \\ -\lfloor G_{\hat{v}_{I,k|k-1}} \times \rfloor G_g \\ -\lfloor G_{\hat{p}_{I,k|k-1}} \times \rfloor G_g \end{bmatrix}$$

and collect the constraints resulting from each block row of the above vector. Specifically, from the first block row we have $$C(I_{\bar{q}_{G,k+1|k}}) G_g = \hat{\Phi}_{11} C(I_{\bar{q}_{G,k|k-1}}) G_g \quad (59)$$

$$\Rightarrow \hat{\Phi}_{11}^* = C(I, k+1|k_{\bar{q}_{I,k|k-1}}) \quad (60)$$

The requirements for the third and fifth block rows are $$\hat{\Phi}_{31} C(I_{\bar{q}_{G,k|k-1}}) G_g = \lfloor G_{\hat{v}_{I,k|k-1}} - G_{\hat{v}_{I,k+1|k}} \times \rfloor G_g \quad (61)$$

$$\hat{\Phi}_{51} C(I_{\bar{q}_{G,k|k-1}}) G_g = \lfloor \delta t {}^G\hat{v}_{I,k|k-1} - G_{\hat{p}_{I,k+1|k}} \times \rfloor G_g \quad (62)$$

both of which are in the form Au=w, where u and w are nullspace vector elements that are fixed. In order to ensure that (61) and (62) are satisfied, a perturbed A* is found for A=$\Phi_{31}$ and A=$\Phi_{51}$ that fulfills the constraint. To compute the minimum perturbation, A*, of A, the following minimization problem is formulated:

$$\min_{A^*} \|A^* - A\|_F^2, \text{ s.t. } A^* u = w \quad (63)$$

where $\|\cdot\|_F$ denotes the Frobenius matrix norm. After employing the method of Lagrange multipliers, and solving the corresponding KKT optimality conditions, the optimal A* that fulfills (63) is $$A^* = A - (Au - w)(u^T u)^{-1} u^T. \quad (64)$$

Once the modified $\hat{\Phi}_{11}^*$ is computed from (60), and $\hat{\Phi}_{13}^*$ and $\hat{\Phi}_{51}^*$ from (63) and (64), the corresponding elements of $\hat{\Phi}_k$ is updated and the covariance propagation is addressed.

Modification of H

During each update step, we seek to satisfy $\hat{H}_k \hat{N}_k = 0$. In turn, this means that $$\hat{H}_k \hat{N}_{t,k} = 0 \quad (65)$$

$$\hat{H}_k \hat{N}_{r,k} = 0 \quad (66)$$

must both hold. Expressing (65) for a single point we have [see (27) and (52)]

$$\hat{H}_c [\hat{H}_q \; 0_{3\times 9} \; \hat{H}_p | \hat{H}_f] \begin{bmatrix} 0_3 \\ 0_3 \\ 0_3 \\ 0_3 \\ I_3 \\ I_3 \end{bmatrix} = 0 \quad (67)$$

which is satisfied automatically, since $\hat{H}_p = -\hat{H}_f$ [see (30) and (31)]. Hence, the nullspace direction corresponding to translation is not violated.

Expanding the second constraint (66), we have $$\hat{H}_c [\hat{H}_q \; 0_{3\times 3} \; \hat{H}_p | \hat{H}_f] \begin{bmatrix} C({}^I\bar{q}_{G,k|k-1}) G_g \\ 0_3 \\ -\lfloor {}^G\hat{v}_{I,k|k-1} \times \rfloor G_g \\ 0_3 \\ -\lfloor {}^G\hat{p}_{I,k|k-1} \times \rfloor G_g \\ -\lfloor {}^G\hat{f}_{k|k-\ell} \times \rfloor G_g \end{bmatrix} = 0 \quad (68)$$

Since $\hat{H}_P = -\hat{H}_f$, (68) is equivalent to satisfying the following relationship $$[\hat{H}_c \hat{H}_q \; \hat{H}_c \hat{H}_p] \begin{bmatrix} C({}^I\bar{q}_{G,k|k-1}) G_g \\ \lfloor {}^G\hat{f}_{k|k-\ell} - {}^G\hat{p}_{I,k|k-1} \times \rfloor G_g \end{bmatrix} = 0 \quad (69)$$

-continued $$[\hat{H}_{c\bar{q}} \quad \hat{H}_{cp}] \begin{bmatrix} C(^I\hat{\bar{q}}_{G,k|k-1})^G g \\ \lfloor ^G\hat{f}_{k|k-\ell} - ^G\hat{p}_{I,k|k-1} \times \rfloor^G g \end{bmatrix} = 0$$

where we have implicitly defined $\hat{H}_{c\bar{q}}$ and $\hat{H}_{cP}$ as elements of the Jacobian. This is a constraint of the form Au=0, where u is a function of the nullspace elements, and hence is fixed, while A comprises block elements of the measurement Jacobian. We compute the optimal A* that satisfies (69) using (63) and (64). By direct application of (63), for $$A = [\hat{H}_{c\bar{q}} \quad \hat{H}_{cp}] \tag{70}$$

$$u = \begin{bmatrix} C(^I\hat{\bar{q}}_{G,k|k-1})^G g \\ \lfloor ^G\hat{f}_{k|k-\ell} - ^G\hat{p}_{I,k|k-1} \times \rfloor^G g \end{bmatrix}$$

$$w = 0$$

A* is computed as:

$$A^* = A - Au(u^T u)^{-1} u^T \tag{71}$$

After computing the optimal A*, the Jacobian elements are recovered as $$\hat{H}_{c\bar{q}}^* = A^*_{1:2,1:3} \tag{72}$$

$$\hat{H}_{cP}^* = A^*_{1:2,4:6} \tag{73}$$

$$\hat{H}_{cf}^* = -\hat{H}_{cP}^* \tag{74}$$

where the subscripts (i:j, m:n) denote the submatrix spanning rows i to j, and columns m to n. Hence the modified observability matrix is $$\hat{H}_k^* = [\hat{H}_{c\bar{q}}^* \; 0_{2 \times 9} \; \hat{H}_{cP}^* \; \hat{H}_{cf}^*] \tag{75}$$

Having computed the modified measurement Jacobian, the filter update is performed. By following this process, it can be ensured that the EKF estimator 22 does not gain information along the unobservable directions of the system. An overview of one example of the OC-VINS modified EKF estimator is presented in Algorithm 1.

As the camera-IMU platform (VINS 10) moves into new environments, new features are added to the map constructed within VINS 24. This entails intersecting the bearing measurements from multiple camera observations to obtain an initial estimate of each new feature's 3D location, as well as computing the initial covariance and cross-correlation between the new landmark estimate and the state. This can be solved as a minimization problem over a parameter vector $x = [x_{s,1}^t \ldots x_{s,m}^T | f^T]^T$, where $x_{s,i}$, i=1 . . . m, are the m camera poses which the new landmark, f, was observed from. Specifically, the following is minimized:

$$C(x) = \frac{1}{2} \left\{ (x - \hat{x})^T \begin{bmatrix} P_{ss}^{-1} & 0 \\ 0 & 0 \end{bmatrix} (x - \hat{x}) + \sum_i (z_i - h(x))^T R_i^{-1}(z_i - h(x)) \right\}, \tag{76}$$

where $P_{ss}^{-1}$ is the information matrix (prior) of the state estimates across all poses obtained from the filter, and we have no initial information about the feature location (denoted by the block (2,2) element of the prior information being equal to zero). The m measurements $z_i$, i=1 . . . m are the perspective projection observations of the point. Stochastic cloning over m time steps are employed to ensure that the cross-correlation between the camera poses are properly accounted for.

An initial guess for the landmark location is obtained using any intersection method, and then (76) is iteratively minimized. At each iteration, the following linear system of equations is solved:

$$\begin{bmatrix} P_{ss}^{-1} + H_s^T R^{-1} H_s & H_s^T R^{-1} H_f \\ H_f^T R^{-1} H_s & H_f^T R^{-1} H_f \end{bmatrix} \begin{bmatrix} \tilde{x}_s \\ \tilde{x}_f \end{bmatrix} = \tag{77}$$

$$\begin{bmatrix} H_s^T R^{-1} \\ H_f^T R^{-1} \end{bmatrix} \tilde{z} \leftrightarrow \begin{bmatrix} A & U \\ V & C \end{bmatrix} \tilde{x} = \begin{bmatrix} P \\ Q \end{bmatrix} \tilde{z}$$

Applying the Sherman-Morrison-Woodbury matrix identity, we solve the system by inverting the matrix on the left-hand side as $$\begin{bmatrix} A & U \\ V & C \end{bmatrix}^{-1} = \begin{bmatrix} \gamma_1 & \gamma_2 \\ \gamma_3 & \gamma_4 \end{bmatrix} \tag{78}$$

where $$Y_1 = (A - UC^{-1}V)^{-1} \tag{79}$$

$$= P_{ss} - P_{ss} H_s^T \cdot \{M^{-1} - M^{-1} H_f (H_f^T M^{-1} H_f)^{-1} H_f^T M^{-1}\} H_s P_{ss}$$

$$Y_2 = Y_3^T \tag{80}$$

$$= -(A - UC^{-1}V)^{-1} UC^{-1}$$

$$= -P_{ss} H_s^T M^{-1} H_f (H_f^T M^{-1} H_f)^{-1}$$

$$Y_4 = C^{-1} V (A - UC^{-1}V)^{-1} UC^{-1} + C^{-1} \tag{81}$$

$$= (H_f^T M^{-1} H_f)^{-1}.$$

Here, $M = H_s P_{ss} H_s^T + R$. During each iteration, the parameter vector is updated as $$x^{\oplus} = x^{\ominus} + \begin{bmatrix} A & U \\ V & C \end{bmatrix}^{-1} \begin{bmatrix} P \\ Q \end{bmatrix} \tilde{z} \tag{82}$$

After the minimization process converges, the posterior covariance of the new state (including the initialized feature) is computed as:

$$P^{\oplus} = \begin{bmatrix} A & U^{-1} \\ V & C \end{bmatrix}, \tag{83}$$

where each element is defined from (79)-(80).

Simulations

Monte-Carlo simulations were conducted to evaluate the impact of the proposed Observability-Constrained VINS (OC-VINS) method on estimator consistency. The proposed methodology was applied to two VINS systems: (i) Visual Simultaneous Localization and Mapping (V-SLAM), and (ii) the Multi-state Constraint Kalman Filter (MSC-KF), which performs visual-inertial localization without constructing a map.

Simulation 1: Application of the Proposed Framework to V-SLAM

In this section, the results of applying the proposed OC-VINS techniques to V-SLAM (referred to as OC-V-

Figure 2A:
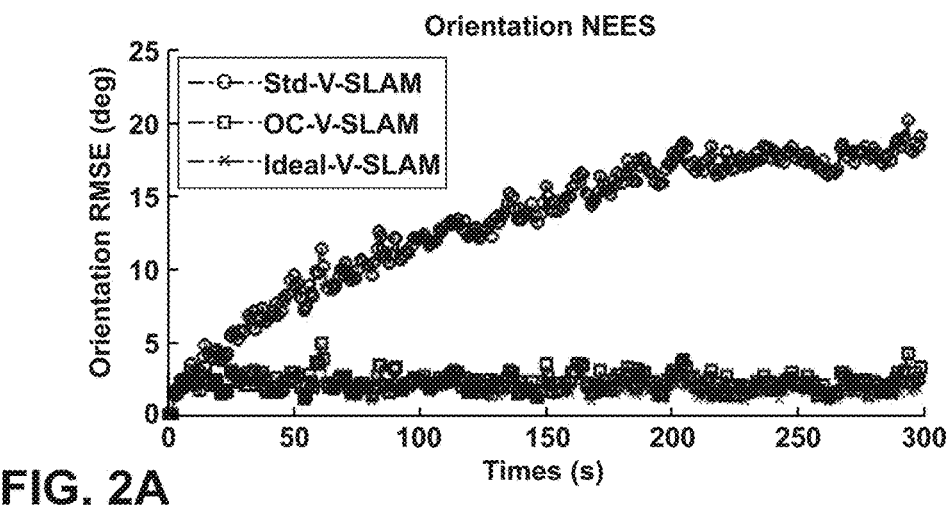
FIGS. 2(a)-2(f) are plots associated with Simulation 1. The RMSE and NEES errors for orientation (a)-(b) and position (d)-(e) are plotted for all three filters, averaged per time step over 20 Monte Carlo trials.
Figure 2B:
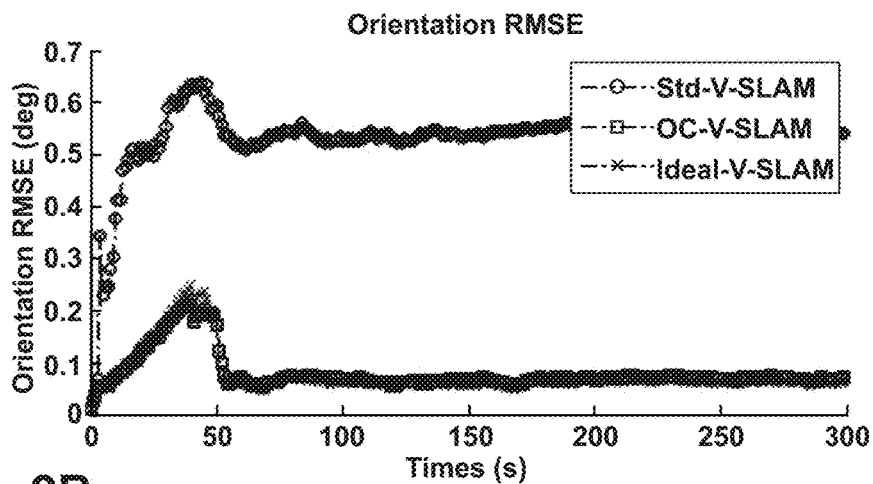
Figure 2C:
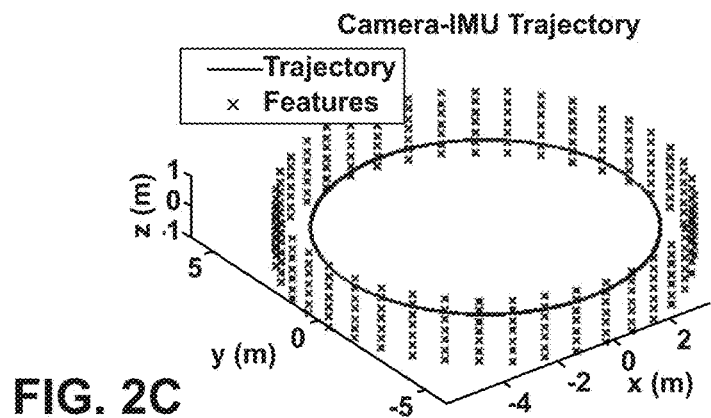
Figure 2D:
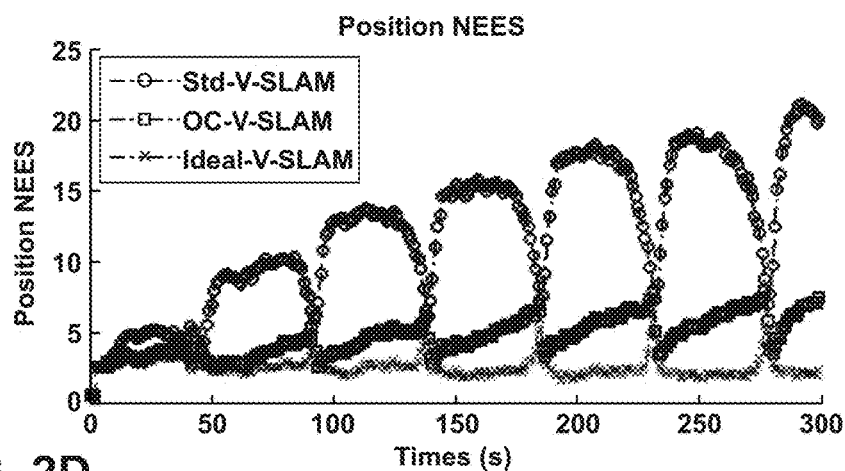
Figure 2E:
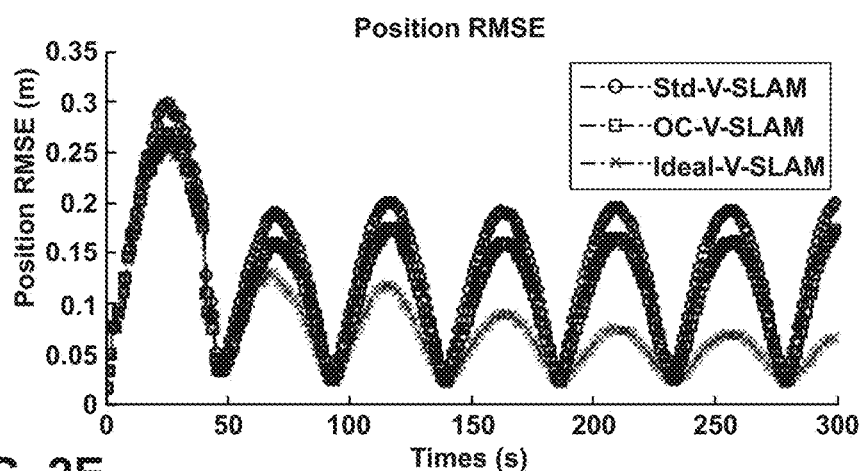
Figure 2F:
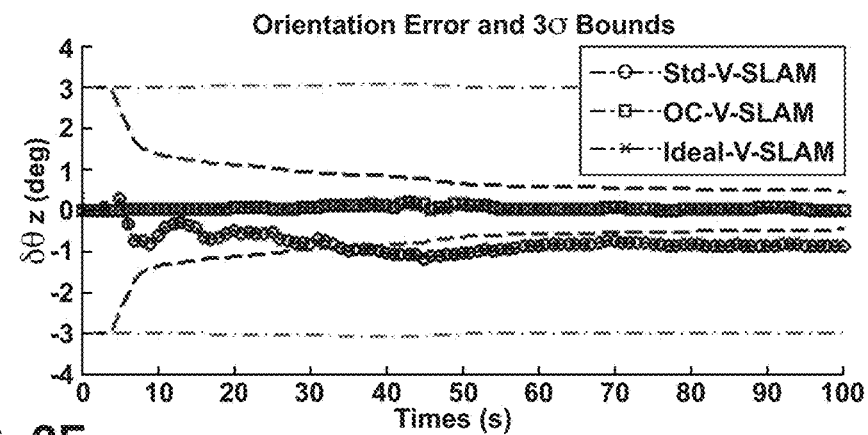

SLAM) are described. The Visual Simultaneous Localization and Mapping (V-SLAM) paradigm refers to a family of algorithms for fusing inertial measurements with visual feature observations. In V-SLAM, the current IMU pose, as well as the 3D positions of all visual landmarks are jointly estimated. The performance of OC-SLAM described herein is compared to the standard V-SLAM (Std-V-SLAM), as well as the ideal V-SLAM that linearizes about the true state. Specifically, the Root Mean Squared Error (RMSE) and Normalized Estimation Error Squared (NEES) were computed over 20 trials in which the camera-IMU platform traversed a circular trajectory of radius 5 m at an average velocity of 60 cm/s. The camera had 45 deg field of view, with $\sigma_{px}=1px$, while the IMU was modeled after MEMS quality sensors. The camera observed visual features distributed on the interior wall of a circumscribing cylinder with radius 6 m and height 2 m (see FIG. 2C). The effect of inconsistency during a single run is depicted in FIG. 2f. The error and corresponding 3σ bounds of uncertainty are plotted for the rotation about the gravity vector. It is clear that the Std-V-SLAM gains spurious information, hence reducing its 3σ bounds of uncertainty, while the Ideal-V-SLAM and the OC-V-SLAM do not. The Std-V-SLAM becomes inconsistent on this run as the orientation errors fall outside of the uncertainty bounds, while both the Ideal-V-SLAM and the OC-V-SLAM remain consistent. FIG. 2 also displays the RMSE and NEES plots, in which it is observed that the OC-V-SLAM attains orientation accuracy and consistency levels similar to the Ideal-V-SLAM, while significantly outperforming the Std-V-SLAM. Similarly, the OC-V-SLAM obtains better positioning accuracy compared to the Std-V-SLAM.

Simulation 2: Application of the Proposed Framework to MSC-KF

The OC-VINS methodology described herein was applied to the MSC-KF (referred herein as "OC-MSC-KF"). In the MSC-KF framework, all the measurements to a given OF are incorporated during a single update step of the filter, after which each OF is marginalized. Hence, in the OC-MSC-KF, the sub-blocks of the nullspace corresponding to the features [i.e., $N_{f_i}$, i=1, ..., N, see (56)] are not maintained. Instead, only the portion of the nullspace corresponding to the state of VINS 10 is propagated forward, and the feature nullspace block for each feature is formed only when it is processed in an update.

Figure 3:
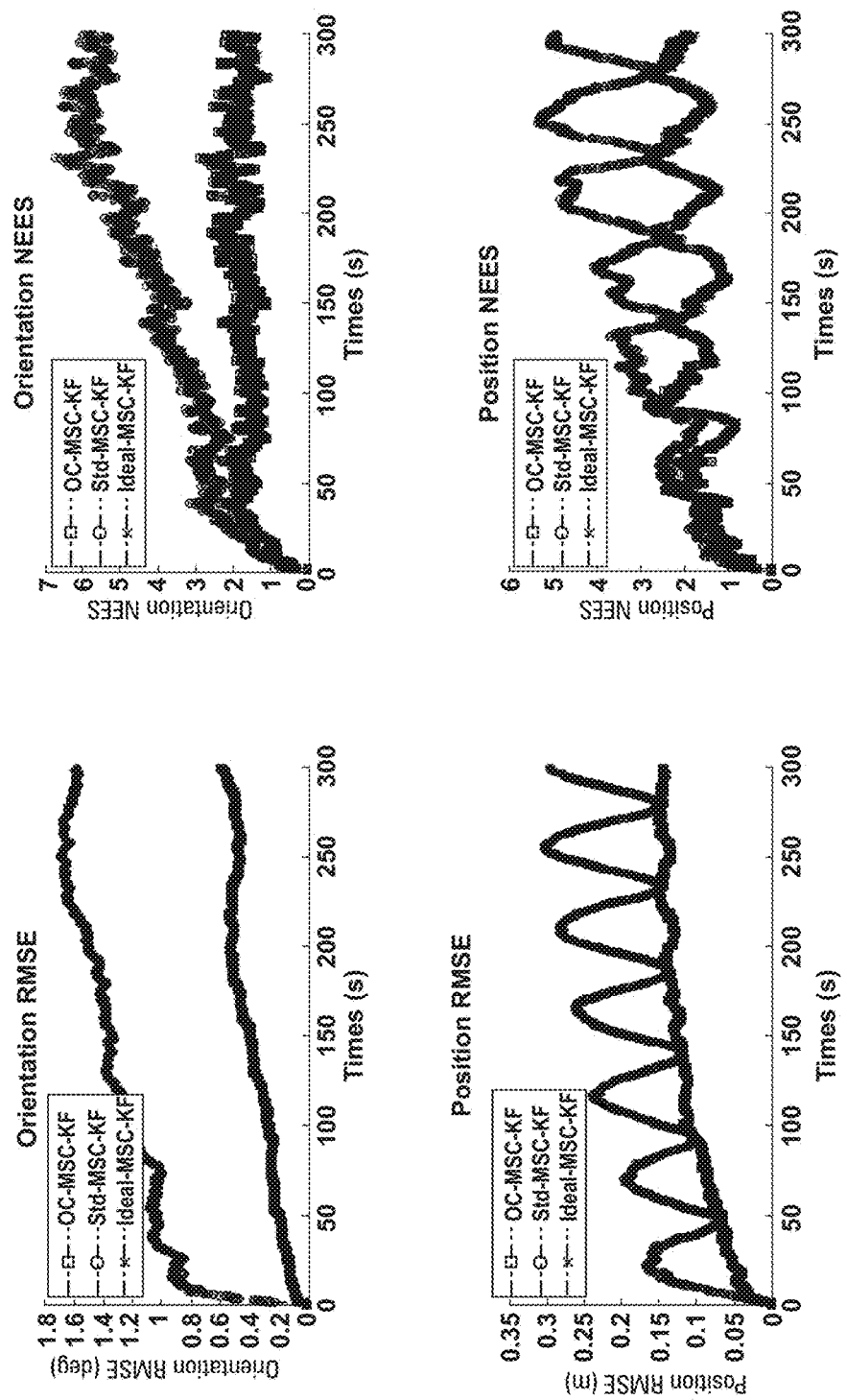
FIG. 3 illustrates a set of plots associated with Simulation 2 including the average RMSE and NEES over 30 Monte-Carlo simulation trials for orientation (above) and position (below). Note that the OC-MSC-KF attained performance almost indistinguishable to the Ideal-MSC-KF.

Monte-Carlo simulations were conducted to evaluate the consistency of the proposed method applied to the MSC-KF. Specifically, the standard MSC-KF (Std-MSC-KF) was compared with the Observability-Constrained MSC-KF (OC-MSC-KF), which is obtained by applying the methodology described herein, as well as the Ideal-MSC-KF, whose Jacobians are linearized at the true states, which were used as a benchmark. The RMSE and NEES were evaluated over 30 trials (see FIG. 3) in which the camera-IMU platform traversed a circular trajectory of radius 5 m at an average speed of 60 cm/s, and 50 randomly distributed features per image were observed. As evident, the OC-MSC-KF outperforms the Std-MSC-KF and attains performance almost indistinguishable from the Ideal-MSC-KF in terms of RMSE and NEES.

EXPERIMENTAL RESULTS

Figure 4A:
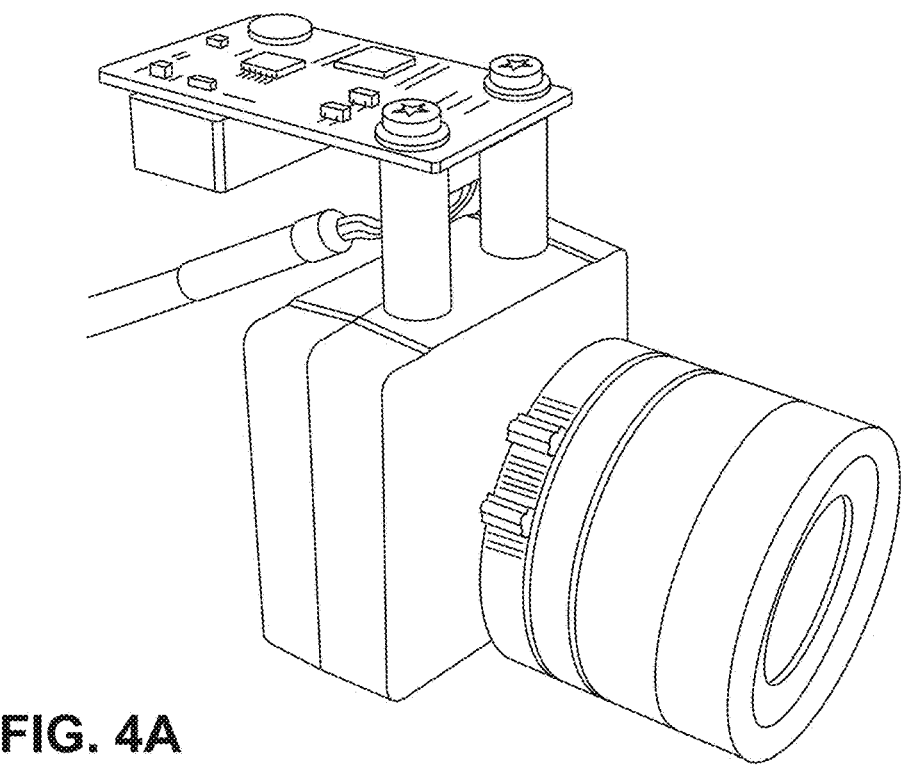
FIG. 4(a) is a photograph showing an experimental testbed that comprises a light-weight InterSense NavChip IMU and a Point Grey Chameleon Camera.
Figure 4B:
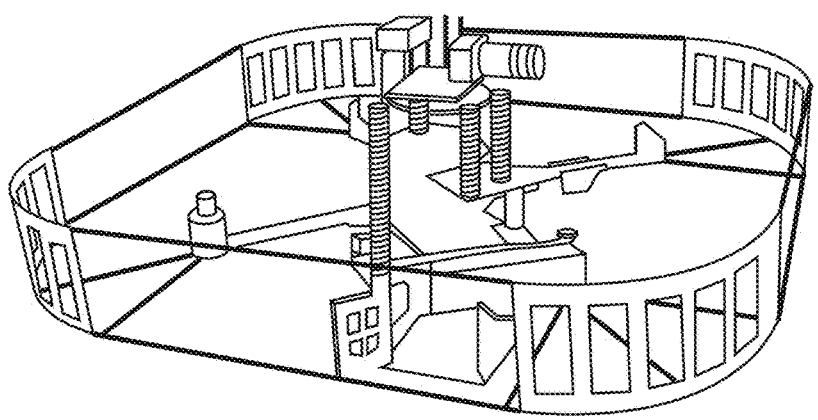
FIG. 4(b) is a photograph illustrating an AscTech Pelican on which the camera-IMU package was mounted during the indoor experiments.

The proposed OC-VINS framework were also validated experimentally and compared with standard VINS approaches. Specifically, the performance of OC-V-SLAM and OC-MSC-KF were evaluated on both indoor and outdoor datasets. In the experimental setup, a light-weight sensing platform comprised of an InterSense NavChip IMU and a PointGrey Chameleon camera (see FIG. 4(a)) was utilized. IMU signals are sampled at a frequency of 100 Hz while camera images are acquired at 7.5 Hz. The dimensions of the sensing package in this example are approximately 6 cm tall, by 5 cm wide, by 8 cm deep.

During the indoor experimental tests, the sensing platform was mounted on an Ascending Technologies Pelican quadrotor equipped with a VersaLogic Core 2 Duo single board computer. For the outdoor dataset, the sensing platform was head-mounted on a bicycle helmet, and interfaced to a handheld Sony Vaio. An overview of the system implementation is described, along with a discussion of the experimental setup and results.

Example Implementation

The image processing is separated into two components: one for extracting and tracking short-term opportunistic features (OFs), and one for extracting persistent features (PFs) to use in V-SLAM.

OFs are extracted from images using the Shi-Tomasi corner detector. After acquiring image k, it is inserted into a sliding window buffer of m images, {k−m+1, k−m+2, ..., k}. We then extract features from the first image in the window and track them pairwise through the window using the KLT tracking algorithm. To remove outliers from the resulting tracks, we use a two-point algorithm to find the essential matrix between successive frames. Specifically, given the filter's estimated rotation (from the gyroscopes' measurements) between image i and j, $^{i}\bar{q}_{j}$, we estimate the essential matrix from only two feature correspondences. This approach is more robust than the five-point algorithm because it provides two solutions for the essential matrix rather than up to ten. Moreover, it requires only two data points, and thus it reaches a consensus with fewer hypotheses when used in a RANSAC framework.

The PFs are extracted using SIFT descriptors. To identify global features observed from several different images, we first utilize a vocabulary tree (VT) structure for image matching. Specifically, for an image taken at time k, the VT is used to select which image(s) taken at times 1, 2, ..., k−1 correspond to the same physical scene. Among those images that the VT reports as potential matches, the SIFT descriptors from each of them are compared to those from image k to create tentative feature correspondences. The epipolar constraint is then enforced using RANSAC and Nister's five-point algorithm to eliminate outliers. It is important to note that the images used to construct the VT (offline) are not taken along our experimental trajectory, but rather are randomly selected from a set of representative images.

Experiment 1: Indoor Validation of OC-V-SLAM

In the first experimental trial, we compared the performance of OC-V-SLAM to that of Std-V-SLAM on an indoor trajectory. The sensing platform traveled a total distance of 172.5 m, covering three loops over two floors in Walter Library at the University of Minnesota. The quadrotor was returned to its starting location at the end of the trajectory, to provide a quantitative characterization of the achieved accuracy.

Opportunistic features were tracked using a window of m=10 images. Every m camera frames, up to 30 features from all available PFs are initialized and the state vector is augmented with their 3D coordinates. The process of initializing PFs is continued until the occurrence of the first loop closure; from that point on, no new PFs are considered and the filter relies upon the re-observation of previously initialized PFs and the processing of OFs.

Figure 5A:
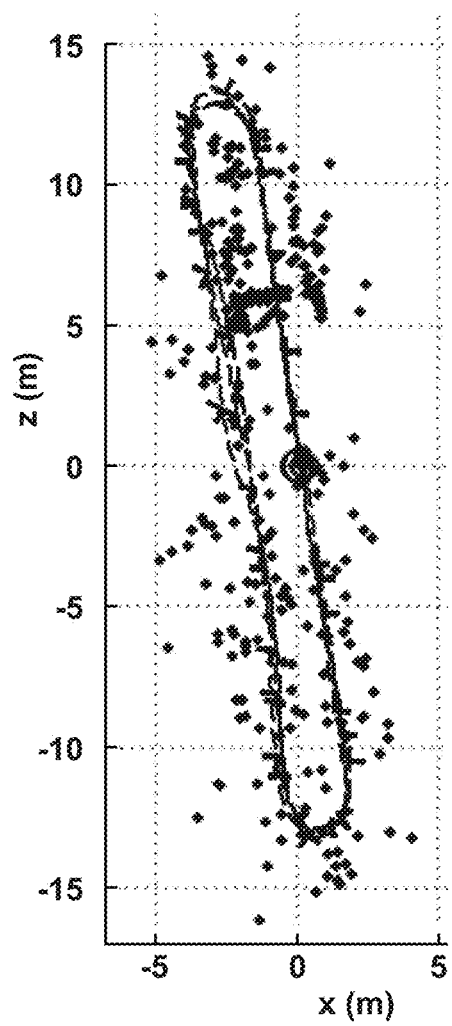
FIGS. 5(a)-5(c) are a set of plots associated with Experiment 1 including the estimated 3D trajectory over the three traversals of the two floors of the building, along with the estimated positions of the persistent features.
Figure 5B:
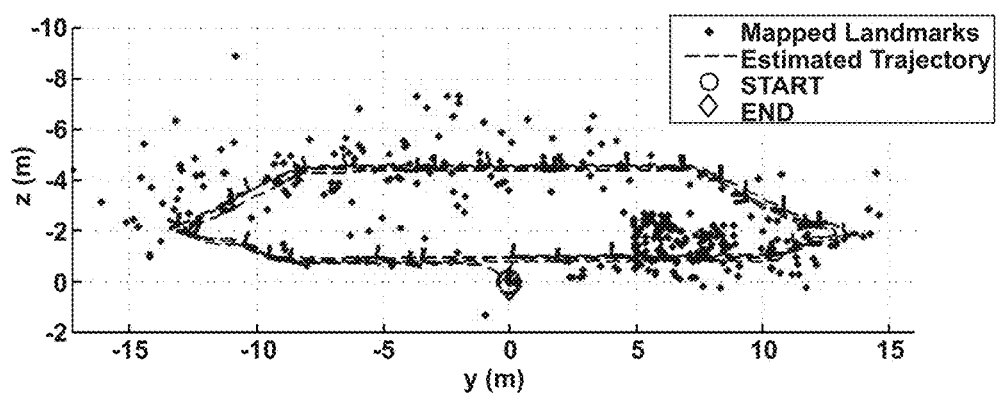
Figure 5C:
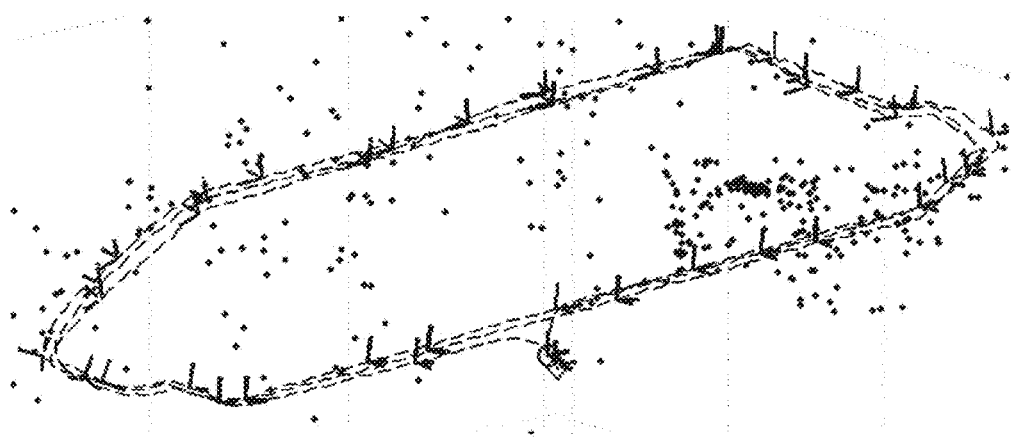

For both the Std-V-SLAM and the OC-V-SLAM, the final position error was approximately 34 cm, which is less than 0.2% of the total distance traveled (see FIG. 5). However, the estimated covariances from the Std-V-SLAM are smaller than those from the OC-V-SLAM (see FIG. 6). Furthermore, uncertainty estimates from the Std-V-SLAM decreased in directions that are unobservable (i.e., rotations about the gravity vector); this violates the observability properties of the system and demonstrates that spurious information is injected to the filter.

Figure 6A:
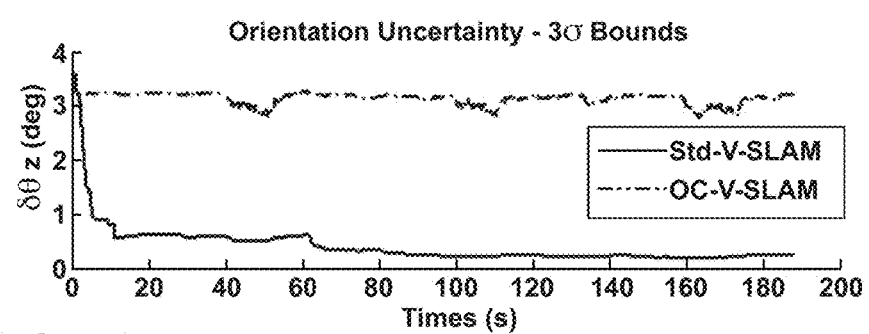
FIG. 6 are a set of plots associated with Experiment 1 including comparison of the estimated 3 σ error bounds for attitude and position between Std-V-SLAM and OC-V-SLAM.
Figure 6B:
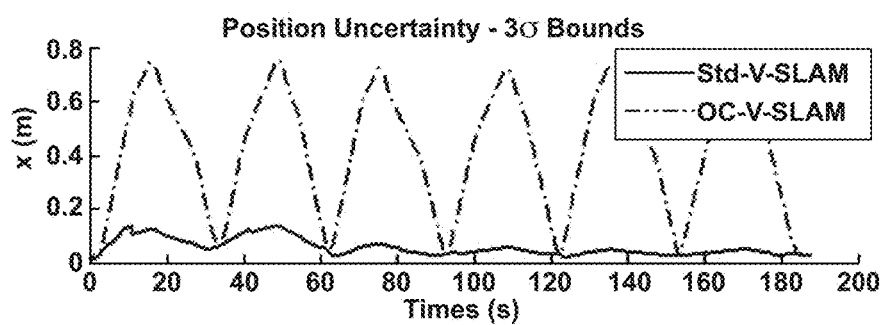

FIG. 6(a) highlights the difference in estimated yaw uncertainty between the OC-V-SLAM and the Std-V-SLAM. In contrast to the OC-V-SLAM, the Std-V-SLAM covariance rapidly decreases, violating the observability properties of the system. Similarly, large differences can be seen in the covariance estimates for the x-axis position estimates (see FIG. 6(b)). The Std-V-SLAM estimates a much smaller uncertainty than the OC-V-SLAM, supporting the claim that the Std-V-SLAM tends to be inconsistent.

Experiment 2: Indoor Validation of OC-MSC-KF

The proposed OC-MSC-KF was validated on real-world data. The first test comprised a trajectory 50 m in length that covered three loops in an indoor area, after which the testbed was returned to its initial position. At the end of the trajectory, the Std-MSC-KF had a position error of 18.73 cm, while the final error for the OC-MSC-KF was 16.39 cm (approx. 0.38% and 0.33% of the distance traveled, respectively). In order to assess the impact of inconsistency on the orientation estimates of both methods, the rotation between the first and last images computed independently using Batch Least-Squares (BLS) and feature point matches was used as ground truth. The Std-MSC-KF had final orientation error [0.15 −0.23 −5.13] deg for roll, pitch, and yaw (rpy), while the rpy errors for the OC-MSC-KF were [0.19 −0.20 −1.32] deg respectively.

Figure 7A:
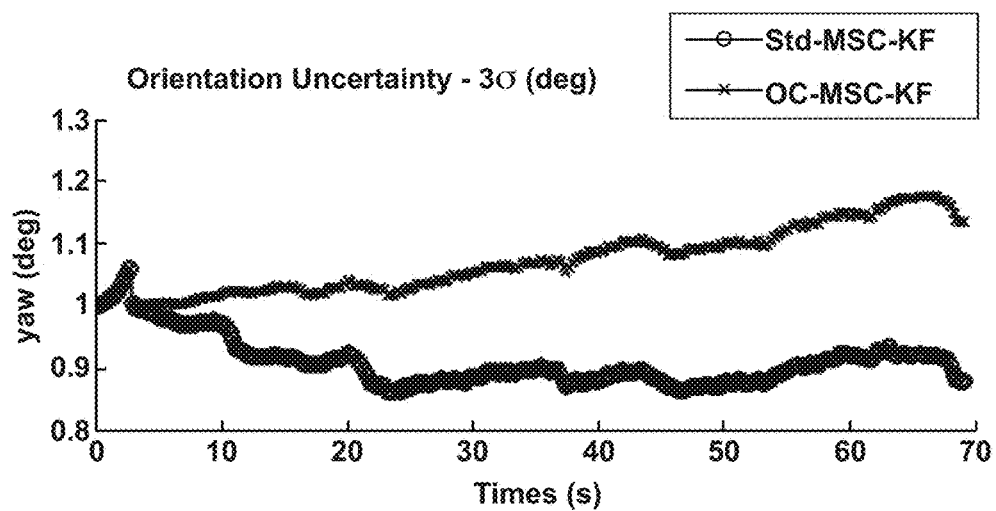
FIGS. 7(*a*) and (7*b*) are a set of plots associated with Experiment 2 including the position (a) and orientation (b) uncertainties (3σ bounds) for the yaw angle and the y-axis, which demonstrate that the Std-MSC-KF gains spurious information about its orientation.
Figure 7B:
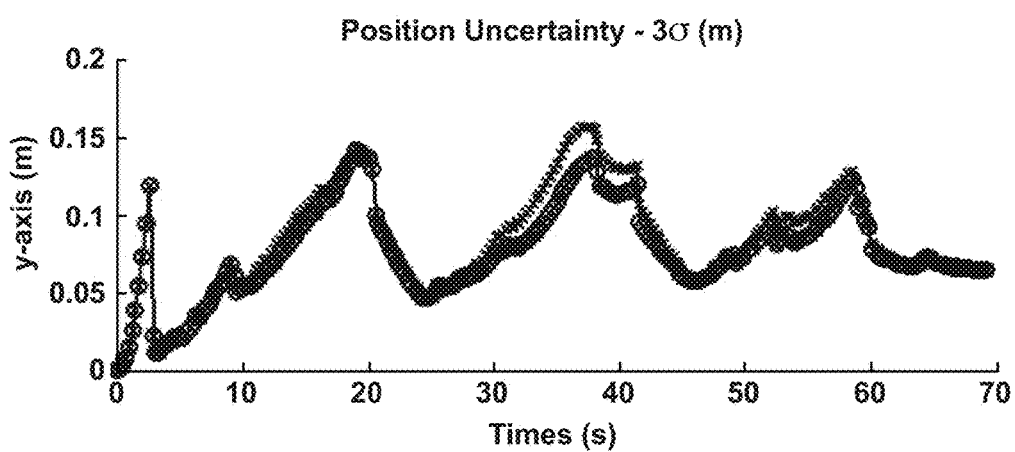
Figure 8A:
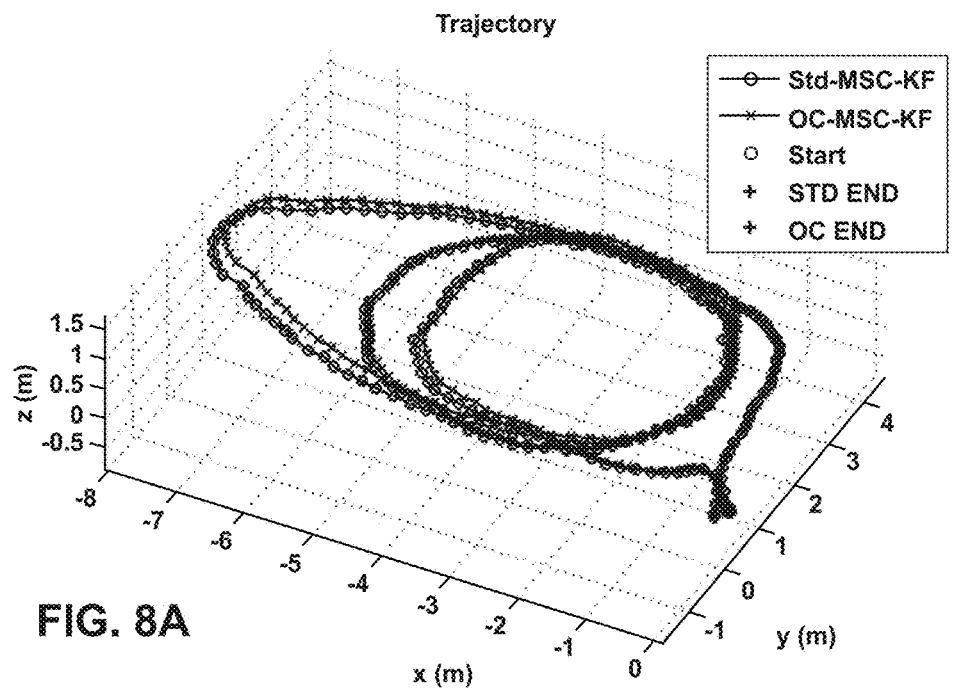
FIGS. 8(*a*) and 8(*b*) are another set of plots for Experiment 2: The 3D trajectory (a) and corresponding overhead (x-y) view (b).
Figure 8B:
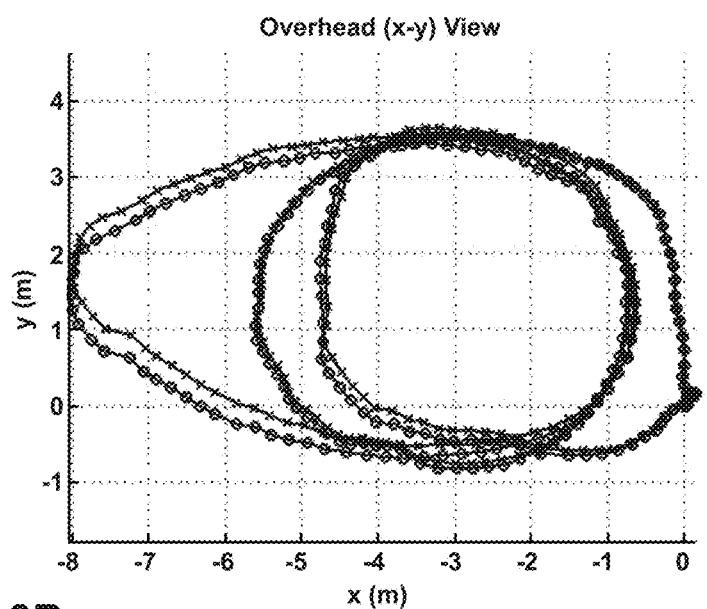

In addition to achieving higher accuracy, for yaw in particular, the OC-MSC-KF is more conservative since it strictly adheres to the unobservable directions of the system. This is evident in both the position and orientation uncertainties. The y-axis position and yaw angle uncertainties is plotted in FIG. 7, as representative results. Most notably, the yaw uncertainty of the OC-MSC-KF remains approximately 1.13 deg ($3\sigma$), while for the Std-MSC-KF it reduces to 0.87 deg ($3\sigma$). This indicates that the Std-MSC-KF gains spurious orientation information, which leads to inconsistency. Lastly, FIG. 8 shows the 3D trajectory along with an overhead (x-y) view. It is evident that the Std-MSC-KF yaw error impacts the position accuracy, as the Std-MSC-KF trajectory exhibits a rotation with respect to the OC-MSC-KF.

Experiment 3: Outdoor Validation of OC-MSC-KF

Figure 9A:
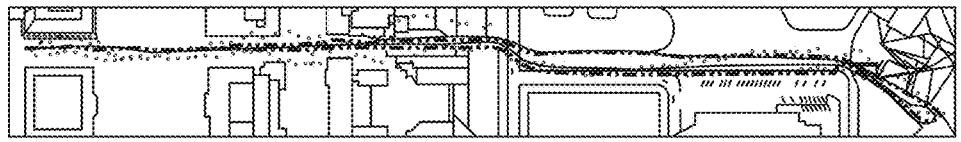
FIGS. 9(*a*)-9(*c*) are photographs associated with Experiment 3.

In the final experimental trial, the OC-MSC-KF was tested on a large outdoor dataset (approx. 1.5 km in length). FIG. 9(a) depicts the OC-MSC-KF (red) and the Std-MSC-KF (blue) trajectory estimates, along with position markers from a low-grade onboard GPS receiver (green). In order to assess the accuracy of both filters, the estimates are overlaid on an overhead image.

Figure 9B:
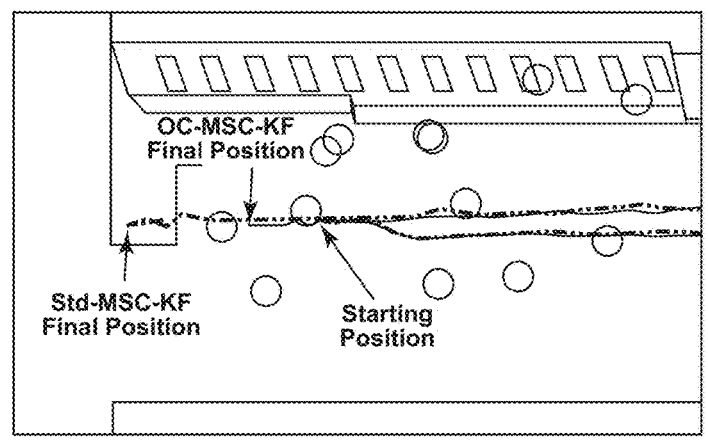

FIG. 9(b) depicts a zoomed-in plot of the starting location (center) for both filters, along with the final position estimates. In order to evaluate the accuracy of the proposed method, the sensing platform was returned to its starting location at the end of the trajectory. The OC-MSC-KF obtains a final position error of 4.38 m (approx. 0.3% of the distance traveled), while the Std-MSC-KF obtains a final position error of 10.97 m. This represents an improvement in performance of approximately 60%.

Figure 9C:
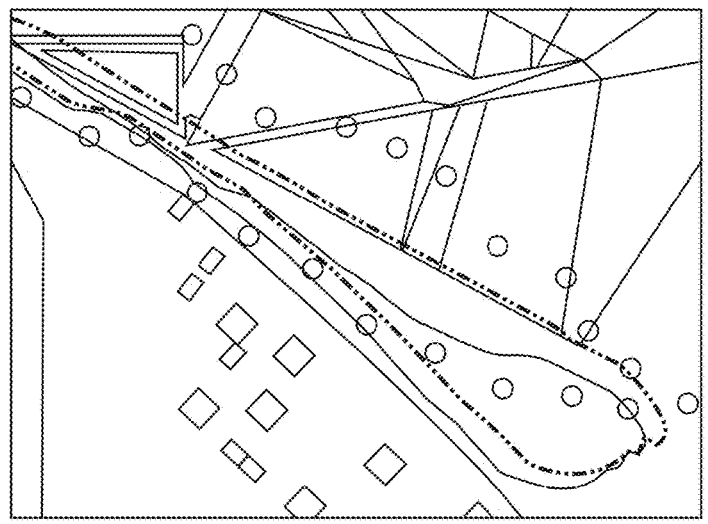

The filters' performance is also illustrated visually in FIG. 9(c) which shows a zoomed-in plot of the turn-around point. The OC-MSC-KF estimates remain on the light-brown portion of the ground (which is the sidewalk), which coincides with the true trajectory. In contrast, the Std-MSC-KF estimates drift over the dark triangles in the image, which are wading pools filled with water. This shifting of the trajectory represents a slight rotation around the vertical axis, indicating a violation of the rotation nullspace direction $N_r$.

Figure 10A:
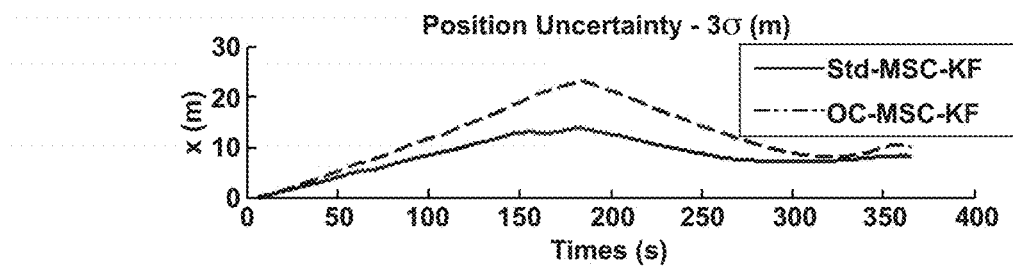
FIGS. 10(*a*) and 10(*b*) are a set of plots for Experiment 3.
Figure 10B:
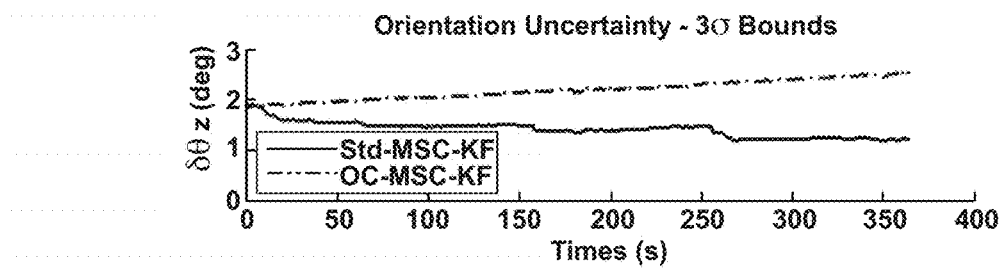

FIGS. 10A, 10B depict the uncertainty in the position estimates along the x-axis (perpendicular to the direction of motion), along with the uncertainty in yaw (corresponding to rotations about the gravity vector). In particular, FIG. 10(a) illustrates position uncertainty along the x-axis (perpendicular to the direction of motion) for the Std-MSC-KF, and OC-MSC-KF respectively. The OC-MSC-KF maintains more conservative estimates for position, indicating that the Std-MSC-KF may be inconsistent. FIG. 10(b) illustrates orientation uncertainty about the vertical axis (z). Since rotations about gravity are unobservable, the Std-MSC-KF should not gain any information in this direction. However, as evident from this plot, the Std-MSC-KF uncertainty reduces, indicating inconsistency. For the OC-MSC-KF, the uncertainty does not decrease, indicating that the OC-MSC-KF respects the unobservable system directions. It is clear that the Std-MSC-KF reduces its uncertainty in its heading direction, indicating that the filter gains spurious information, while the OC-MSC-KF does not gain information for the rotation around the gravity vector.

This disclosure analyzed the inconsistency of VINS from the standpoint of observability. For example, it was showed that standard EKF-based filtering approaches lead to spurious information gain since they do not adhere to the unobservable directions of the true system. Furthermore, an observability-constrained VINS approach was applied to mitigate estimator inconsistency by enforcing the nullspace explicitly. An extensive simulation and experimental results were presented to support and validate the described estimator, by applying it to both V-SLAM and the MSC-KF.

Additional Techniques

The following section describes state initialization for an INS comprised of an Inertial Measurement Unit (IMU), equipped with a tri-axial accelerometer and a tri-axial gyroscope. The section describes a frame {I} attached to the IMU, and a local vertical frame {G} whose origin coincides with the IMU position, while its orientation is fixed such that $$\frac{1}{\|^G g\|_2} {}^G g = [0 \ 0 \ 1]^T = e_3,$$

where $^G g$ is the (local) gravitational acceleration vector whose magnitude is considered known a priori. Before using the measurements of an IMU, we need to compute precise estimates of the roll ($\varphi$) and pitch ($\Theta$) angles, of the frame {I} expressed in {G}, as well as, estimates of the gyroscope ($b_g$) and accelerometer biases ($b_a$).

State and Measurement Model

In this example, the system state is the 10×1 vector:

$$x = [{}^I_{T_qG} b_g^T b_a^T]^T \quad (1.1)$$

The first component of the sensor-platform state is ${}^tq_G(t)$ which is the unit quaternion representing the orientation of the global frame {G} in the IMU frame, {I}, at time t. The state also includes the biases, $b_g(t)$ and $b_a(t)$, affecting the gyroscope and accelerometer measurements, which are modeled as random-walk processes driven by the zero-mean, white Gaussian noise $n_{wg}(t)$ and $n_{wa}(t)$, respectively. With the state of the system defined, the continuous-time kinematic model which governs the time evolution of the system state is described.

Continuous-Time Model

The system model describing the time evolution of the state is:

$$^I\dot{\bar{q}}_G(t) = \frac{1}{2}\Omega(\omega(t)){}^I\bar{q}_G(t) \quad (1.2)$$

$$\dot{b}_g(t) = n_{wg}(t), \dot{b}_a(t) = n_{wa}(t) \quad (1.3)$$

In these expressions, $\omega(t) = [\omega_1(t)\ \omega_2(t)\ \omega_3(t)]^T$ is the rotational velocity of the IMU, expressed in {I}, and $$\Omega(\omega) = \begin{bmatrix} -\lfloor\omega\times\rfloor & \omega \\ -\omega^T & 0 \end{bmatrix}, \lfloor\omega\times\rfloor \triangleq \begin{bmatrix} 0 & -\omega_3 & \omega_2 \\ \omega_3 & 0 & -\omega_1 \\ -\omega_2 & \omega_1 & 0 \end{bmatrix}$$

Inertial Measurements Under Motion

The gyroscope and accelerometer measurements, $\omega_m$ and $a_m$, are modeled as:

$$\omega_m(t) = \omega(t) + b_g(t) + n_g(t) \quad (1.4)$$

$$a_m(t) = C({}^tq_G(t))({}^Ga(t) - {}^Gg) + b_a(t) + n_a(t), \quad (1.5)$$

where $n_g$ and $n_a$ are zero-mean, white Gaussian noise processes, and ${}^Ga(t)$ is the body acceleration expressed in {G}

Inertial Measurements for Static IMU

When the IMU is static, the inertial measurements are described by:

$$\omega_m(t) = b_g(t) + n_g(t) \quad (1.6)$$

$$a_m(t) = -C({}^tq_G(t))({}^Gg) + b_a(t) + n_a(t), \quad (1.7)$$

since ${}^Ga(t) = 0_{3\times 1}$, $\omega(t) = 0_{3\times 1}$, due to the static constraint. Note, that in practice the IMU samples $\omega_m(t)$ and $a_m(t)$, and provides their corresponding discrete samples $\omega_k$, $a_k$, at time-step $t_k$.

Static Periods Detection

In this section it is described how at time step $t_k$, a Boolean variable $s_k$ is set to 1 (static) or 0 (moving). We compute:

$$d_k = \|\omega_k - \hat{b}_g\|_2 \quad (1.8)$$

where $\hat{b}_g$ is the current estimate of the gyroscope biases, $\varepsilon$ is a threshold depending on the discrete time noise characteristics of the IMU's gyroscopes and $b_k$ is a Boolean variable.

Finally, we set $s_k$ as:

$$s_k = b_{k-L} \wedge \ldots \wedge b_k \quad (1.10)$$

where $\wedge$ is the logical AND operator and L is the length of time-window of measurements we consider, depending on the sensor's accuracy and the desired robustness.

Static Phases

This section discusses the processing of IMU measurements when $s_k = 1$. Consider that N IMU measurements are collected, corresponding to a first static period.

Gyroscope Biases Initialization

The gyroscope biases are initialized as:

$$\hat{b}_g = \frac{1}{N}\sum_{i=1}^N (\omega_i),\ P_{\hat{b}_g} = \frac{1}{N}\sigma_{gd}^2 I \quad (1.11)$$

where $\sigma_{gd}$ is the discrete time variance of the gyroscope measurements' white noise component. Similarly we get:

$$^I\hat{g} = -\frac{1}{N}\sum_i a_i,\ {}^I\hat{z}_G = \frac{1}{\|g\|_2}{}^I\hat{g} \quad (1.12)$$

Note that:

$$^z_G C({}^tq_G)e_3 \quad (1.13)$$

where ${}^Iz_G$ is the z-axis of frame {G} expressed in {I}. There are two different methods, for computing an initial estimate for ${}^tq_G$, both of which are described in the next sections.

Extracting Directly the Roll and Pitch Angles

The roll and pitch angles of frame {I} can be extracted. Let $C({}^Iq_G) = C_x^T(\varphi)C_y^T(\theta)C_z^T(\psi)$, we get:

$$I_{\hat{z}_G} = C_x^T(\hat{\phi})C_y^T(\hat{\theta})e_3 \Rightarrow I_{\hat{z}_G} = \begin{bmatrix} z_1 \\ z_2 \\ z_3 \end{bmatrix} = \begin{bmatrix} -\sin(\hat{\theta}) \\ \cos(\hat{\theta})\sin(\hat{\phi}) \\ \cos(\hat{\phi})\sin(\hat{\theta}) \end{bmatrix} \quad (1.14)$$

Which can be solved as:

$$\sin(\hat{\theta}) = z_1 \quad (1.15)$$

$$\cos(\hat{\theta}) = \pm\sqrt{1 - z_1^2} \quad (1.16)$$

$$\sin(\hat{\phi}) = \frac{z_2}{\cos(\hat{\theta})} \quad (1.17)$$

$$\cos(\hat{\phi}) = \frac{z_3}{\cos(\hat{\theta})} \quad (1.18)$$

After fixing $\cos(\hat{\theta}) = \sqrt{1 - z_1^2}$, we get: (1.19)

$$\hat{\theta} = \text{atan2}\left(-z_1, \sqrt{1 - z_1^2}\right) \quad (1.20)$$

$$\hat{\phi} = \text{atan2}\left(\frac{z_2}{\cos(\hat{\theta})}, \frac{z_3}{\cos(\hat{\theta})}\right) \quad (1.21)$$

After that, we set $\psi = 0$, and the rotational matrix is extracted as:

$$C({}^I_{\bar{q}G}) = C_x^T(\hat{\phi})C_y^T(\hat{\theta}) \quad (1.22)$$

Extracting $I_{\bar{q}G}$ from $C(I_{\bar{q}G})$ is described.

Extracting the Rotational Matrix $C({}^I q_G)$

Since the yaw angle $\psi$, can be set to an arbitrary value, an alternative method would be to construct the rotational matrix $C({}^I q_G)$ directly:

$$I_{\hat{z}_G} = \frac{1}{\|g\|_2} {}^I \hat{g} \tag{1.23}$$

$$I_{\hat{x}'_G} = (I_3 - I_{\hat{z}_G} I_{\hat{z}_G}^T)\begin{bmatrix} 1 \\ 0 \\ 0 \end{bmatrix}, I_{\hat{x}_G} = \frac{1}{\|I_{\hat{x}'_G}\|^2} I_{\hat{x}'_G} \tag{1.24}$$

$$I_{\hat{y}_G} = \lfloor I_{\hat{z}_G} \times \rfloor I_{\hat{x}_G} \tag{1.25}$$

$$C(I_{\bar{q}_G}) = [\, I_{\hat{x}_G} \quad I_{\hat{y}_G} \quad I_{\hat{z}_G} \,] \tag{1.26}$$

Thus, we can extract $\hat{\phi}$ and $\hat{\theta}$ from $C(I_{\bar{q}G})$ and proceed as before.

Orientation Initialization

Having an estimate of $I_{\bar{q}G}$, we set its covariance w.r.t. frame {I} as:

$$P_{\delta\theta} = C(I_{\bar{q}_G})\begin{bmatrix} (\sigma_\phi)^2 & 0 & 0 \\ 0 & (\sigma_\theta)^2 & 0 \\ 0 & 0 & 0 \end{bmatrix} C^T(I_{\bar{q}_G}) \tag{1.27}$$

Note that the variances $\sigma_\phi^2$, $\sigma_P^2$ are set heuristically depending on our inertial device, while the covariance element corresponding to yaw is set to 0.

State Initialization

The initial estimate of the state, $\hat{x}$ and its corresponding covariance are given by:

$$\hat{x} = \begin{bmatrix} I_{\bar{q}G} \\ \hat{b}_g \\ \hat{b}_a \end{bmatrix}, P = \begin{bmatrix} P_{\delta\theta} & 0 & 0 \\ 0 & P_{\hat{b}_g} & 0 \\ 0 & 0 & P_{\hat{b}_a} \end{bmatrix} \tag{1.28}$$

Where $P_{\hat{b}_a}$ is set to arbitrary values depending on our device. This procedure takes place only once for the purposes of state initialization.

Subsequent Static Periods

For each time step $t_k$, which $s_k=1$, beyond the first N static time steps, we propagate and update our state estimates.

Static Propagation

Let $\sigma_{nwg,d}^2$ and $\sigma_{nwa,d}^2$ be the variances of the discretized white noises $n_{wg}(t)$ and $n_{wa}(t)$, driving the gyroscope and accelerometer biases respectively. The static state propagation takes the form:

$$\hat{x} \leftarrow \hat{x} \tag{1.29}$$

$$P \leftarrow P + \begin{bmatrix} 0 & 0 & 0 \\ 0 & \sigma_{nwg,d}^2 I & 0 \\ 0 & 0 & \sigma_{nwa,d}^2 I \end{bmatrix} \tag{1.30}$$

Static Update

Our non-linear measurement model is given by:

$$z_k = \begin{bmatrix} z_{\omega,k} \\ z_{a,k} \end{bmatrix} \tag{1.31}$$

$$z_{\omega,k} = b_{g,k} + n_{g,k} \tag{1.32}$$

$$z_{a,k} = -C(I_{k\bar{q}G}) G_g + b_{a,k} + n_{a,k} \tag{1.33}$$

Where $$\begin{bmatrix} n_{g,k} \\ n_{a,k} \end{bmatrix}$$

follows a distribution $\mathcal{N}(0_{6\times 1}, R)$, $$R = \begin{bmatrix} \sigma_{ng,d}^2 I & 0 \\ 0 & \sigma_{na,d}^2 I \end{bmatrix}.$$

The measurement Jacobian H is given by:

$$H_k = \begin{bmatrix} 0 & I & 0 \\ -\lfloor C(I_{k\bar{q}G}) G_g \times \rfloor & 0 & I \end{bmatrix} \tag{1.35}$$

and the expected measurement $\hat{z}_k$ is:

$$\hat{z}_k = \begin{bmatrix} \hat{b}_{g,k} \\ -C(I_{k\bar{q}G}) G_g + \hat{b}_{a,k} \end{bmatrix} \tag{1.36}$$

Using the linearized measurement model defined above, we perform an EKF update:

$$K = P H_k^T (H_k P H_k^T + R)^{-1} \tag{1.37}$$

$$\delta x \leftarrow K(z_k - \hat{z}_k) \tag{1.38}$$

$$\delta q = \frac{1}{\sqrt{1 + \frac{1}{4}\delta x_{1:3}^T \delta x_{1:3}}} \begin{bmatrix} \frac{1}{2}\delta x_{1:3} \\ 1 \end{bmatrix} \tag{1.39}$$

$$\hat{x}_{1:4} \leftarrow \delta_q \otimes \hat{x}_{1:4} \tag{1.40}$$

$$\hat{x}_{1:4} \leftarrow \frac{1}{\|\hat{x}_{1:4}\|^2} \hat{x}_{1:4} \tag{1.41}$$

$$\hat{x}_{5:10} \leftarrow \hat{x}_{5:10} + \delta x_{4:9} \tag{1.42}$$

$$P \leftarrow (I - K H_k) P (I - K H_k)^T + K R K^T \tag{1.43}$$

where $\otimes$ represents the quaternion multiplication as described.

Moving Phases—Hovering

In this section, an example method for detecting the start and the end of a "hovering" motion profile for a sliding window estimator employed to VINS is described.

Detecting and Dealing with "Hovering"

The frame attached to the optical center of the camera is denoted by {C}. By hovering, we denote the case where the sensor platforms has undergone small or zero translation. To detect a hovering condition during which a translation of the vision-aided inertial navigation system in each direction is below a threshold amount. A boolean scalar variable $h_i$, is used to denote, whether the sensor platform is hovering ($h_i1$) or not ($h_i0$.)

At time-step $t_i$, the (2-pt/0-pt) RANSAC of the feature tracker described herein returns a set of N feature correspondences, described in homogeneous coordinates, $$m = 1 \ldots N, \left\{ \begin{bmatrix} C_{i-1_{u_m}} \\ C_{i-1_{v_m}} \end{bmatrix}, \begin{bmatrix} C_{i_{u_m}} \\ C_{i_{v_m}} \end{bmatrix} \right\}$$

between images i−1 and i, corresponding to time-steps $t_{i-1}$ and $t_i$, respectively. From the orientation state estimates we construct the orientation between camera frames {$C_i$} and {$C_{i-1}$}, denoted by $^{C_i}q_{C_{i-1}}$.
We compute:

$$d_i = \frac{1}{N} \sum_{m=1}^{N} \left\| \begin{bmatrix} C_{i_{u_m}} \\ C_{i_{v_m}} \\ 1 \end{bmatrix} - C(C_{i_q C_{i-1}}) \begin{bmatrix} C_{i-1_{u_m}} \\ C_{i-1_{v_m}} \\ 1 \end{bmatrix} \right\|_2 \quad (2.1)$$

and set:

$$b_i = 1 \text{ if } d_i < \varepsilon, \text{ else } b_i = 0 \quad (2.2)$$

where $b_i$ is a boolean scalar variable and ε a threshold depending on the noise of the homogeneous feature coordinates. Let $h_k$ be a binary variable declaring whether the sensor platform is "hovering" ($h_k=1$) or not ($h_k=0$), at time step k. We decide whether the platform is currently hovering or not using the following logical expression:

$$h_i = (\neg h_{i-1} \wedge (b_{i-L_1} \wedge \ldots \wedge b_i)) \vee (h_{i-1} \wedge (b_{i-L_2} \vee \ldots \vee b_i)) \quad (2.3)$$

where $\wedge$ is the logical AND operator, $\vee$ is the logical OR operator and $L_1$ and $L_2$, denote the length of the time windows used to decide whether we are entering or leaving a hovering period, respectively. Finally, we deal with "hovering" by the following way:

The estimator considers a sliding window of camera images (SWCI(k)={$I_{k-m}, \ldots, I_k$}).

If no hovering is detected, the SWCI in the next time step k+1 drops the oldest image $I_{k-m}$ and adds the current $I_{k+1}$ (i.e. SWCI(k)={$I_{k-m+1}, \ldots, I_k, I_{k+1}$}) and so on so forth.

If hovering is detected then the newest image $I_k$ is replaced w the current one and SWCI(k+1)= {$I_{k-m}, \ldots, I_{k-1}, I_{k+1}$} etc.

Inertial Navigation System (INS) Sensor to Sensor Time Synchronization

In this section, we discuss the sensor-to-sensor time synchronization problem. Fusing measurements of different sensors requires their time synchronization, since they typically produce data with respect to their local clock.

In the next section, we will provide the problem definition, and a formulation of a 2-sensor time synchronization problem where each sensor measures its relative orientation between consecutive time steps.

The techniques can be extended to any number of sensors.
Approach

Suppose that we have two rigidly connected sensors I and C, and they provide measurements with rates $f_I$ and $f_C$ respectively, where $f_I \gg f_C$. We define a frame {I} attached to sensor I, and a frame {C} attached to sensor C.

Each of the two sensors provides measurements of its frame relative rotation between two consecutive time steps, as following:

$$I: I_{\hat{k}_{tk,tk+1}}, \theta'_{tk,tk+1} \quad (3.1)$$

$$C: C_{\hat{k}_{t'_n,t'_{n+1}}}, \theta_{t'_n,t'_{n+1}}$$

Sensor I measures the relative orientation between its two local frames at time steps $t_k$ and $t_{k+1}$, which can be represented by the unit vector $^I k_{t_k,t_{k+1}}$ and a rotation angle $\Theta_{t_k,t_{k+1}}$ around it. Similarly sensor C but with respect to its local frame. Note that, we use different timing notations for the two sensors since they have different time references.

Furthermore, since the two sensors are rigidly attached to each other, the angles of their respective relative rotations, $\Theta_{t_k,t_{k+1}}, \Theta_{t_k,t_{k+1}}$, corresponding to the same time interval, are equal. This will be the "key" property that we will exploit later so as to synchronize the clocks of the two sensors.

Figure 11:
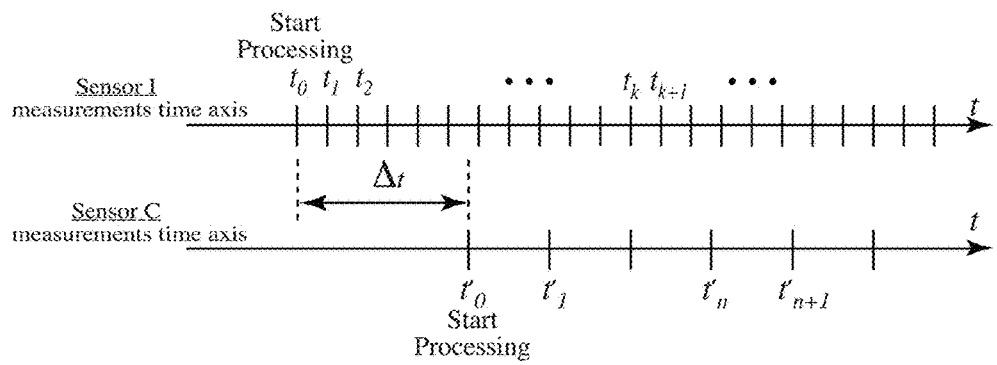
FIG. 11 is a plot showing sensors I and C clocks.

Let us denote by $t_0$, the time reference (corresponding to 0), of sensor's 1 clock, and $t'_0$, the time reference of sensor C. The clocks of the two sensors have a constant time shift $\Delta t = t_0 - t'_0$ (See FIG. 11).

Sensor I provides N measurements. Using these measurements we can generate the set of quaternions, {$^{I_m}q_{I_0}$}, m=1 ... N. Sensor C provides M measurements, from which we keep the relative angles of rotation, namely {$\theta_{j, j+1}$}, j=1 ... M. Since the two sensors are rigidly attached to each other, their respective relative rotations, corresponding to the same time interval, are equal. Hence, we can estimate $\Delta t$, by solving the following optimization problem:

$$\widehat{\Delta t} \arg\min\{\Sigma_{l=1}^{M}(\theta'_{t_m,t_n} - \theta_{t'_l,t'_{l+1}})^2\}$$

$$t_m = t'_l + \Delta t \quad (3.2)$$

$$t_n = t'_{l+1} + \Delta t \quad (3.3)$$

As demonstrated in Algorithm 1, we perform exhaustive search over all possible $\Delta t$'s, and pick the one that minimizes the cost function. This option is not computationally intensive since we know that $\Delta t$, belongs to a small interval [$\Delta t_{min}, \Delta t_{max}$].

---

Algorithm 1: Exhaustive search for $\Delta t$

---

Data: {$I_m q_{I_0}$}, m = 1 ... N, {$\theta_{j,j+1}$}, j = 1 ... M
Result: $\widehat{\Delta t}$ For $\Delta t_i = \Delta t_{min} : \frac{1}{fI} : \Delta t_{max}$ do For j = 1 ... M do
        Compute $s_j = t_j' + \Delta t_i$;
        Compute $s_{j+1} = t_{j+1}' + \Delta t_i$;
        Find $t_m \in \{t_1 \ldots t_N\}$ closest to $s_j$;
        Find $t_n \in \{t_1 \ldots t_N\}$ closest to $s_{j+1}$;

Compute $I_{m q_{I_n}} = I_{m q_{I_0}} \otimes I_{n q_{I_0}} - 1$;

-continued

Algorithm 1: Exhaustive search for Δt

Extract $theta_{t_m,t_n}'$ from $^{I_m}\bar{q}_{t_n}$ as described;
Compute $C_i = \sum_{j=1}^M (\theta_{t_m,t_n}' - \theta_{t_j,t_{j+1}})^2$;
Return $\widehat{\Delta t} = \Delta t_\lambda$ s.t. $C_\lambda = \min\{C_i\}$, over all hyhpotheses $\Delta t_i$;

Extrinsic Calibration of Rigidly Connected Sensors: Orientation Determination

In this section, we study the problem of finding the relative orientation between two rigidly connected sensors. Assume there are two rigidly connected sensors $S_1$ and $S_2$, and the sensors are moving into consecutive poses: sensor $S_1$ starts from pose frame $\{1\}$, and moves to $\{2\}, \{3\}, \ldots, \{N\}$, with corresponding $S_2$ pose frames $\{1'\}, \{2'\}, \{3'\}, \ldots, \{N'\}$. Also for each sensor, we measure the rotations (in terms, e.g., of quaternions) between each pair of sensor poses, so we know $_2^1 q_{s_1}, _3^2 q_{s_1}, \ldots, _N^{N-1} q_{s_1}$ for $S_1$, and similarly $_{2'}^{1'} q_{s_2}, _{3'}^{2'} q_{s_2}, \ldots, _{N'}^{N'-1} q_{s_2}$ for $S_2$. With this information known, the goal is to find out the relative orientation $$C = {}_{s_2}^{s_1}C$$

between these two sensors.

Since for any quaternion, we have $$q = \begin{pmatrix} \hat{k}\sin\frac{\Theta}{2} \\ \cos\frac{\Theta}{2} \end{pmatrix} \quad (4.1)$$

where $\hat{k}$ is the unit vector of the rotation axis and $\Theta$ is the angle of rotation, we can calculate $\hat{k}$ as:

$$\hat{k} = \frac{q_{1:3}}{\|q_{1:3}\|} \quad (4.2)$$

So from the measured quaternions, we can use the above equation to obtain the axes of rotations, e.g., $_2^1 k, \ldots, _N^{N-1} k$ from $_2^1 q_{s_1}, \ldots, _N^{N-1} q_{s_1}$ for sensor $S_1$, similarly $^{1'} k, \ldots, ^{N'-1} k$ for sensor $S_2$. However, since the two sensors are rigidly connected, we have the following relationships between these quantities:

$$1_{\hat{k}} = {}_{1'}^{1}C 1'_{\hat{k}} \quad (4.3)$$

$$2_{\hat{k}} = {}_{2'}^{2}C 2'_{\hat{k}}$$

$$\vdots$$

$$N-1_{\hat{k}} = {}_{N'-1}^{N-1}C \, {}^{N'-1} \hat{k} \quad (4.4)$$

and $C = {}_{s_2}^{s_1}C = {}_{1'}^{1}C = {}_{2'}^{2}C = \ldots = {}_{N'-1}^{N-1}C$ Solution of Rotation Matrix To find the rotation matrix C in directly, we stack together to obtain $$[1_{\hat{k}} 2_{\hat{k}} \ldots N-1_{\hat{k}}] = [1'_{\hat{k}} 2'_{\hat{k}} \ldots N'-1_{\hat{k}}] \quad (4.5)$$

One way of solving this system is that since equation is of the form A=CB, we can right multiply both sides by $B^T$ and obtain $$C = AB^T(BB^T)^{-1} \quad (4.6)$$

But since C must be a rotation matrix, we then project the solution of onto the SO(3) space.

To find the rotation matrix C in directly, we stack together to obtain $$[1_{\hat{k}} 2_{\hat{k}} \ldots N-1_{\hat{k}}] = [1'_{\hat{k}} 2'_{\hat{k}} \ldots N'-1_{\hat{k}}] \quad (4.5)$$

One way of solving this system is that since equation is of the form A=CB, we can right multiply both sides by $B^T$ and obtain $$C = AB^T(BB^T)^{-1} \quad (4.6)$$

But since C must be a rotation matrix, we then project the solution of onto the SO(3) space.

Solution of Quaternion of Rotation

An alternative solution is given by the quaternion q of rotation C=C(q). From equation (4.3), we have $$i_{\hat{k}} = {}^i C(q) i'_{\hat{k}} \quad (4.7)$$

$$\Leftrightarrow i_{\hat{k}} q = q \otimes i'_{\hat{k}} \otimes q^{-1} \quad (4.8)$$

$$\Leftrightarrow i_{\hat{k}} \otimes q = q \otimes i'_{\hat{k}} \quad (4.9)$$

$$\Leftrightarrow L(i_{\hat{k}})q = R(i'_{\hat{k}})q \quad (4.10)$$

$$\Leftrightarrow (L(i_{\hat{k}}) - R(i'_{\hat{k}}))q = 0 \quad (4.11)$$

where $i=1, \ldots, N-1, i'=1', \ldots, N'-1$, $\bar{k}=\hat{k}; 0$, $\otimes$ is the quaternion multiplication, and L,R represent the left and right quaternion multiplication matrices. If we stack together equation (4.11) for all time steps, we obtain $M^*q=0$ as:

$$\begin{bmatrix} L(1_{\bar{k}}) - R(1'_{\bar{k}}) \\ L(2_{\bar{k}}) - R(2'_{\bar{k}}) \\ \vdots \\ L(N-1_{\bar{k}}) - R(N'-1_{\bar{k}}) \end{bmatrix} q = 0 \quad (4.12)$$

The solution q is given by the unit eigenvector corresponding to the smallest eigenvalue of $M^TM$.

IMU-Camera Calibration with Calibration Board not-Aligned with Gravity

Introduction

As described, Vision-aided Inertial Navigation Systems (VINS) can provide precise state estimates for the 3D motion of a vehicle when no external references (e.g., GPS) are available. This is achieved by combining inertial measurements from an IMU with visual observations from a camera under the assumption that the rigid transformation between the two sensors is known, i.e., that the position and orientation of the camera can be determined given the position and orientation of the IMU and vice versa. Errors in the IMU-camera calibration process causes biases that reduce the accuracy of the estimation process and can even lead to divergence of any estimator processing the measurements from both sensors. As such, the techniques described below define algorithms for computing calibration parameters that specify the relative positions and orientations of the IMU and the image source of the vision-aided inertial navigation system, i.e., calibration parameters for computing a transformation from the position and orientation of the image source or the IMU to the other. Moreover, techniques are described by which an estimator of a vision-aided inertial navigation system (VINS) estimates the calibration parameters using an external calibration target that need not be aligned to gravity.

Figure 12:
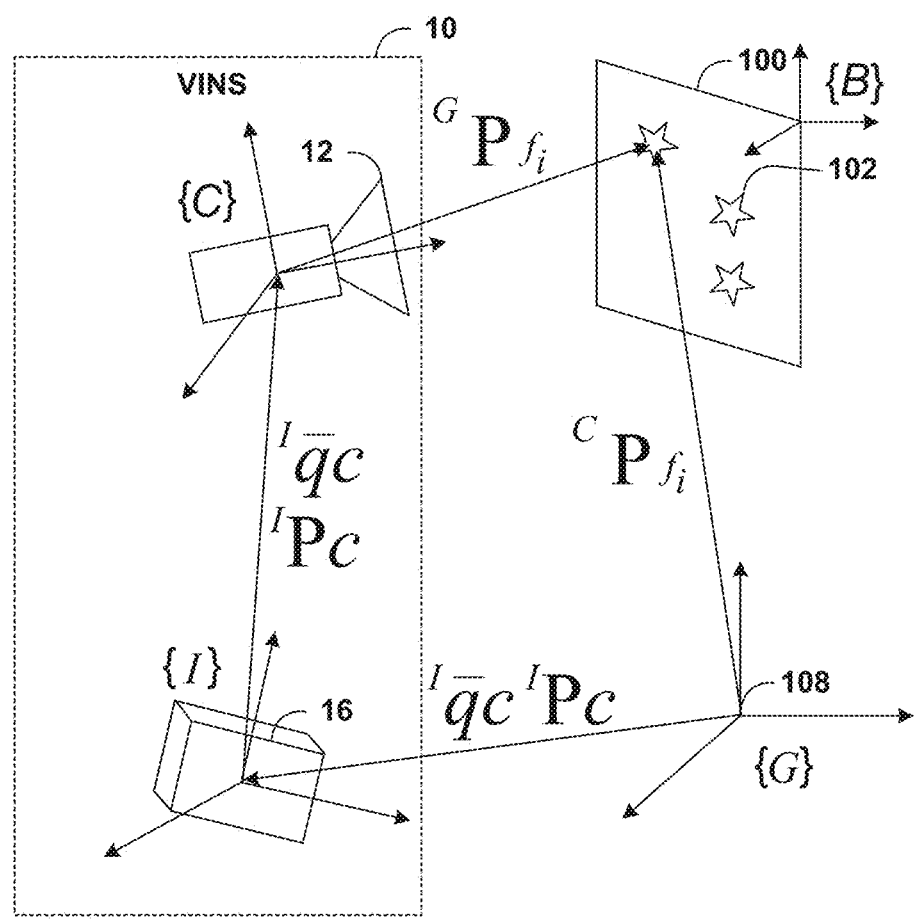
FIG. 12 is a schematic diagram showing the geometric relation between a set of known target (e.g., a target calibration board), an image source and IMU and a global reference frame.
Figure 13:
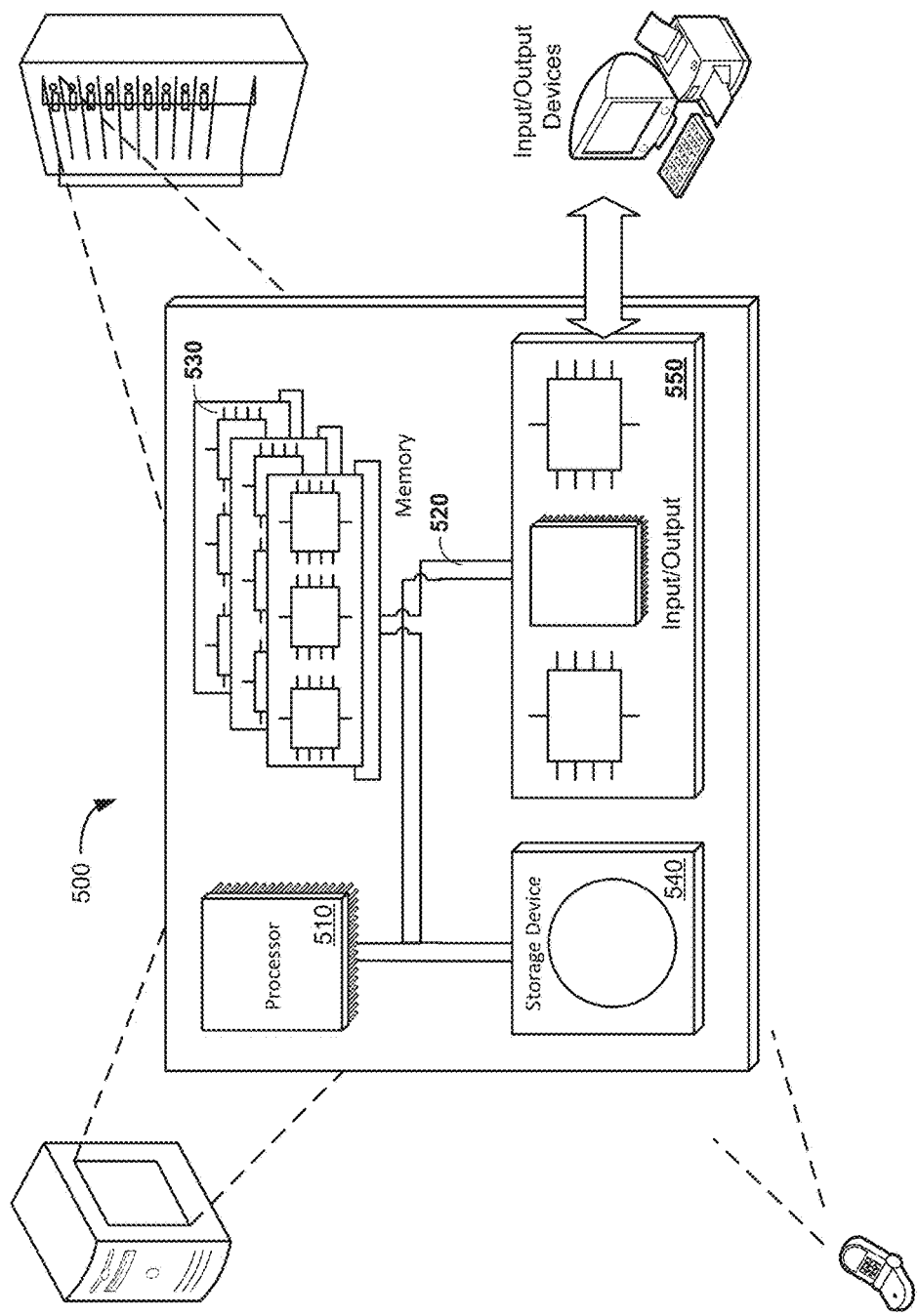
FIG. 13 shows a detailed example of various devices that may be configured to implement various embodiments in accordance with the current disclosure.

FIG. 12 is a schematic diagram showing an example calibration of VINS 10 (FIG. 1). In the example of FIG. 12, the geometric relation is shown for a set of known targets (e.g., a target calibration board 100 having known targets 102), image source 12 of VINS 10, IMU 16 of VINS 10 and a global reference frame 108. In order to fuse measurements from IMU 16 and image source 12 in a VINS, the 6-DOF transformation between these two devices must be known precisely. Inaccuracies in the values of the IMU-camera relative pose (position and attitude) will appear as biases that will reduce the accuracy of the estimation process or even cause estimator 22 to diverge when computing state updates for VINS 10. In most cases, in practice, this unknown transformation is computed manually (e.g., from computer-aided design (CAD) plots) or through the use of additional sensors. Automating this procedure may reduce the cost of deploying a VINS, increase the accuracy of the computed state estimates during regular operation, and minimize the probability of failure due to bias-induced divergence.

A Kalman filter based algorithm for IMU-camera extrinsic calibration can be utilized by observing features whose positions are known with respect to a calibration board frame (e.g., features 102 of calibration target 100), not the global frame 108, and these two frames are not the same. Additionally, the calibration board 100 may not necessarily be substantially aligned with gravity, while the global frame 108 may have its z axis aligned with the same direction of gravity. For example, even with sophisticated, manual techniques, it is often difficult to align calibration target 100 to the z axis relative global frame 100 within 0.1 degrees of accuracy. In this section, algorithms are described that take into account the roll and pitch difference between a frame of reference of calibration target frame 100 and global frame 108, to achieve higher calibration accuracy. As such, the following techniques work for IMU-image source calibration with an arbitrarily placed calibration board, even where less than 0.1 degrees of error is desired.

Problem Description

The example EKF-based algorithm described herein for IMU-camera calibration does not ignore the correlations between the IMU measurements and requires no specialized hardware. Furthermore, the uncertainty in the estimated alignment parameters is provided at every time step by computing their covariance. Finally, rotation of the camera in place results in these parameters becoming observable.

In the task of IMU-camera extrinsic calibration with a calibration board, the goal is to find out the translation $^I p_C$ and the quaternion of rotation $_I q_C$ between an IMU-camera pair. Here the features are known in the frame of the board {B} 100, not in the global frame {G} 108. Moreover, in practice, the target calibration board 100 typically cannot be aligned perfectly with gravity, which is along the direction of z axis of {G} 108.

However, the two frames {B} and {G} can be configured in a way such that they are at the same origin, and they have the same yaw angle (rotation around gravity). In this case, the only differences between these two frames are defined by the roll angle ($G_{\rho_B}$) and the pitch angle ($G_{\Theta_B}$), through the following rotation matrix:

$$_B^G C = C_Y(G_{\Theta_B}) C_X(G_{\rho_B}) \quad (5.1)$$

where $C_X$, $C_Y$ are the rotation matrices around the x and y axes, respectively. Note, there is no translation between frames {B} and {G}.

Algorithm Description

As an example framework, the algorithms for IMU-camera calibration using a calibration target described herein can follow the same approach as in F. M. Mirzaei and S. I. Roumeliotis, "A Kalman filter-based algorithm for IMU-camera calibration: Observability analysis and performance evaluation," IEEE Trans. on Robotics, vol. 24, no. 5, pp. 1143-1156, October 2008, the entire contents of which are incorporated herein by reference (Mirzaei). The Mirzaei framework is an example, and any other estimation algorithm can be used. To account for a calibration target that may not be aligned to gravity, estimator 22 described herein utilizes a different measurement model and Jacobian implementation than Mirzaei.

In general, the IMU-camera calibration can be achieved through a two-step process, as in Mirzaei. First, camera images are processed in a batch algorithm to compute an initial estimate for the camera pose. Additionally, the approximate value of the unknown transformation (e.g., hand-measured or from CAD plots) is combined with the camera-pose estimate to compute an initial estimate for the IMU pose. In the next step, both these estimates are used to initialize the corresponding variables in EKF estimator 22. By sequentially processing additional measurements from the camera and the IMU, the EKF is able to refine the initial estimate for the unknown transformation while simultaneously tracking the position, velocity, and attitude of the two sensors.

Filter Initialization—

The initial estimate for the IMU pose ($^G p_I$, $^I q_G$) is initially determined, where $^G p_I$ denotes the position of the IMU with respect to the global frame of reference and $^I q_G$ is the rotation quaternion between the IMU and the global frames. As in Mirzaei, an estimate for the camera pose is computed using visual features (e.g., corners of squares 102 of a checkerboard calibration target 100) whose positions are known in global coordinates. In the next step of the initialization process, we use an approximate estimate for the unknown IMU-camera transformation. An initial estimate for the IMU pose is then computed.

A linearized continuous-time system model is presented that describes the time evolution of the errors in the state estimates. Discretization of this model allows us to employ the sampled measurements of the IMU for state propagation. The filter state is described by an initial state vector for calibrating the IMU and the image source with respect to each other, where the initial state vector comprises the calibration parameters, position, orientation and velocity of IMU 16 and image source 12 as well as any signal biases for the IMU. In one example, estimator 22 constructs the initial state vector as:

$$X = [^I q_G^T b_g^T {}^G v_I^T b_a^T {}^G p_I^T {}^I q_C^T {}^I p_C^T]^T, \quad (5.2a)$$

where $^I q_G(t)$ and $^I q_C(t)$ are the quaternions that represent the orientation of the global frame and the camera frame in the IMU frame, respectively. The position and velocity of the IMU in the global frame are denoted by $^G p_I(t)$ and $^G v_I(t)$, respectively. $^I p_C(t)$, is the position of the camera in the IMU frame, and $b_g$ and $b_a$ are the 3×1 bias vectors affecting the gyroscope and accelerometer measurements, respectively.

These biases are typically present in the signals of inertial sensors, and need to be modeled and estimated, in order to attain accurate state estimates.

Next, estimator 22 modifies the initial state vector to construct an enhanced state vector in which both the roll angle and the pitch angle of calibration target 100 are included as variables to be estimated. An estimator of a VINS (e.g., estimator 22 of FIG. 1) applies the techniques described in this section to compute calibration parameters for the position and orientation of image source 12 relative to the orientation of IMU 16. At this time, the estimator utilizes the enhanced state vector to account for variability in both the roll angle and the pitch angle of calibration target 100.

In one example, in addition to the motion quantities, biases, and the calibration parameters set out in (5.2a), since the roll angle ($G_{\rho_B}$) and the pitch angle ($G_{\varnothing_B}$) of the calibration target are also unknown, estimator 22 constructs an enhanced state vector x that is to be estimated in an EKF framework. In one example, estimator 22 constructs the enhanced state vector as:

$$X = [{}^I\bar{q}_G{}^T b_g{}^T {}^G v_I{}^T b_a{}^T {}^G p_I{}^T {}^I\bar{q}_C{}^T {}^I p_C{}^T G_{\rho_B} G_{\varphi_B}]^T. \quad (5.2)$$

Filter Propagation

Estimator 22 estimates the IMU pose and linear velocity as well as the unknown transformation (rotation and translation) between the camera and the IMU. Additionally, the filter estimates the biases in the IMU signals. Filter propagation generally utilizes the previously described framework of Mirzaei with the addition of propagation for $G_{\rho_B}$ and $G_{\varnothing_B}$. Since the two frames {B} and {G} are fixed, the estimates of $G_{\rho_B}$ and ${}^G\varphi_B$ should remain constant in state propagation.

In one example, estimator 22 applies the constraint-based estimation techniques described herein when computing the state estimates for the calibration parameters and the roll and pitch of the calibration target. For example, estimator 22 may compute the calibration parameters for the VINS concurrently with computation of estimates of the roll and pitch of the calibration target by applying a constrained estimation algorithm described above to provide information about the state estimates for only a subset of a set of degrees of freedom based on the IMU data and the image data while preventing providing information about the state estimates for at least one of the unobservable degrees of freedom.

Measurement Model and Filter Update

In order to perform filter update during the estimation process, a new measurement model and a corresponding measurement Jacobian matrix for linearizing the measurement model are described. In particular, a new measurement model is expressed with respect to the newly specified parameters, i.e., the roll angle ($G_{\rho_B}$) and the pitch angle ($G_{\varnothing_B}$) of calibration target 100.

In this example calibration process, IMU camera 104 may move continuously and records images of a calibration pattern. Estimator 22 processes the calibration pattern, i.e, the sequence of images, to detect and identify point features. Once this process is completed for each image, a list of point features along with their measured image coordinates is provided to estimator 22, which uses them to update the state estimates for VINS 10.

When observations for N features are available concurrently, the features are stacked in a measurement vector and processed by estimator 22 in a single batch-form update. The projective camera measurement model can be specified as:

$$z_i = \begin{bmatrix} u_i \\ v_i \end{bmatrix} + \eta_i = \begin{bmatrix} x_i/z_i \\ y_i/z_i \end{bmatrix} + \eta_i = h_i(x, {}^B p_{f_i}) + \eta_i \quad (5.3)$$

where $$\begin{aligned} {}^C p_{f_i} = \begin{bmatrix} x_i \\ y_i \\ z_i \end{bmatrix} &= C({}^C q_I) C({}^I q_G)({}^G p_{f_i} - {}^G p_I) - C({}^C q_I){}^I p_C \quad (5.4) \\ &= C({}^C q_I) C({}^I q_G)({}^G_B C^B p_{f_i} - {}^G p_I) - C({}^C q_I){}^I p_C \quad (5.5) \end{aligned}$$

and ${}^B p_{f_i}$ is the feature $f_i$ known in the board frame {B}, and $\eta_i$ is the measurement noise.

The batch measurement Jacobian matrix $H_i$ the calculating the state updates for the enhanced state vector using a linearized model is:

$$H_i = J^i_{cam}[\ J^i_{\theta_G}\ 0_{3\times 9}\ J^i_{P_I}\ J^i_{\theta_C}\ J^i_{P_C}\ J^i_{PB}\ J^i_{\phi B}] \quad (5.6)$$

where $$J^i_{cam} = \frac{1}{\hat{z}_i^2}\begin{bmatrix} \hat{z}_i & 0 & -\hat{x}_i \\ 0 & \hat{z}_i & -\hat{y}_i \end{bmatrix} \quad (5.7)$$

$$J^I_{\theta G} = C(C_{\hat{q}I})\lfloor C(I_{\hat{q}G})(G_{\hat{P}_{f_i}} - G_{\hat{P}_I}) \times \rfloor \quad (5.8)$$

$$J^I_{\theta G} = -C(C_{\hat{q}I})\lfloor C(I_{\hat{q}G})(G_{\hat{P}_{f_i}} - G_{\hat{P}_I}) - I_{\hat{P}C} \times \rfloor \quad (5.9)$$

$$J^i_{P_I} = -C(C_{\hat{q}I}) C(I_{\hat{q}G}) \quad (5.10)$$

$$J^i_{P_C} = -C(C_{\hat{q}I}) \quad (5.11)$$

$$J^i_{PB} = C(C_{\hat{q}I}) C(I_{\hat{q}G}) C_Y(G_{\hat{\phi}_B}) J_{C_X}(G_{\hat{P}_B}) B_{Pf_I} \quad (5.12)$$

$$J^i_{\phi B} = C(C_{\hat{q}I}) C(I_{\hat{q}G}) J_{C_Y}(G_{\hat{\phi}_B}) C_X(G_{\hat{P}_B}) B_{Pf_I} \quad (5.13)$$

with $$\begin{bmatrix} \hat{x}_i \\ \hat{y}_i \\ \hat{z}_i \end{bmatrix} = C(C_{\hat{q}I}) C(I_{\hat{q}G})(G_{\hat{P}_{f_i}} - G_{\hat{P}_i}) - C(C_{\hat{q}I}) I_{\hat{P}C} \quad (5.14)$$

$$G_{\hat{P}_{f_i}} = C_Y(G_{\hat{\phi}_B}) C_X(G_{\hat{P}_B}) B_{Pf_i} \quad (5.15)$$

$$J_{C_X}(G_{\hat{P}_B}) = \begin{bmatrix} 0 & 0 & 0 \\ 0 & -\sin G_{\hat{P}_B} & -\cos G_{\hat{P}_B} \\ 0 & \cos G_{\hat{P}_B} & -\sin G_{\hat{P}_B} \end{bmatrix} \quad (5.16)$$

$$J_{C_Y}(G_{\hat{\phi}_B}) = \begin{bmatrix} -\sin G_{\hat{\phi}_B} & 0 & -\cos G_{\hat{\phi}_B} \\ 0 & 0 & 0 \\ -\cos G_{\hat{\phi}_B} & 0 & -\sin G_{\hat{\phi}_B} \end{bmatrix} \quad (5.17)$$

Estimator 22 applies this Jacobian matrix utilizing, as one example, the filter update framework described in Muirzaei for an IMU-camera calibration process in which the transformation between the two sensors is computed using an external calibration target that need not aligned with gravity. In order to increase the accuracy and numerical stability in the face of the highly nonlinear measurement model, estimator 22 may employ an iterated EKF process to update the state estimates, as described herein. Moreover, as described above, the constrained estimation techniques described herein may likewise be applied during the calibration process to prevent spurious information gain and reduce inconsistency.

Inertial Navigation System (INS) Aided Point Feature Image Prediction
Introduction As discussed, a Vision-aided Inertial Navigation System (VINS) fuses data from a camera and an Inertial Measurement Unit (IMU) to track the pose of a sensing platform. In order to use camera measurements, point feature tracking is one of the key image processing components. In the task of feature tracking, we have measurements of point features extracted from the image corresponding to the current camera pose, and we want to match them with features in the image corresponding to the next camera pose. One solution would be searching the whole image plane from the next camera pose, but this is computationally inefficient. In this section, we use the information of the INS (rotation and translation between two consecutive camera poses) to determine a smaller region on the next image plane for tracking features.

Problem Description

Assume a camera observes one point feature from pose $\{C_1\}$, with measurement u, and then moves to a second pose $\{C_2\}$. Also assume that from gyro measurements we know the rotation $R = {}_2^1 R$ between these two poses. Moreover, we have an estimate of the translation $t = {}^1 t_2$ between these two poses, as well as the minimum distance $d_{min}$ from the feature to camera pose $C_1$. The goal is to find out what the possible region is, on the second image plane, where the feature point v corresponding to u could lie in.

Image Region Prediction
Epipolar Line

Starting from the epipolar constraint $$t_0^T \lfloor u \times \rfloor R v = 0 \tag{6.1}$$

where $t_0$ is the unit vector of t, we know that if $t_0$, u and R are all fixed, then the feature point must be observed on the epipolar line on the second image plane. Note that this epipolar line lies in a 2-D plane (the second image plane), and the position of this epipolar line can be determined from equation (6.1) as follows: first this line goes through the point $$p_0 = \begin{bmatrix} \alpha_x / \alpha_z \\ \alpha_y / \alpha_z \end{bmatrix} \tag{6.2}$$

with $$\alpha = \begin{bmatrix} \alpha_x \\ \alpha_y \\ \alpha_z \end{bmatrix} = R^T u \tag{6.3}$$

and second, the normal vector of this line in the image plane is given by $$n' = \begin{bmatrix} n_x \\ n_y \end{bmatrix} \tag{6.4}$$

with $$n = \begin{bmatrix} n_x \\ n_y \\ n_z \end{bmatrix} = R^T \lfloor u \times \rfloor t_0 \tag{6.5}$$

Depth and Scale Information

Now we discuss the effect of $d_{min}$ and $\|t\|$, where $\|t\|$ is the norm of t, on the image region where we'll look for the corresponding feature, assuming that the direction of translation $t_0$ is fixed. Since u and v are unit vectors, from the geometry, we have $${}^1 f = u d_1 \tag{6.6}$$

$${}^2 f = v d_2 \tag{6.7}$$

$${}^1 f = t + R\, {}^2 f \tag{6.8}$$

where ${}^i f$ is the feature position in frame $\{i\}$, i=1=1, 2, and $d_i$ the distance between the feature and origin of frame $\{i\}$, i=1=1, 2. From these equations we obtain $$v d_2 = R^T u d_1 - R^T t \tag{6.9}$$

$$= R^T u d_1 - R^T t_0 \|t\| \tag{6.10}$$

Thus the feature's image coordinates on the second image plane are given by $$p = \begin{bmatrix} 1 & 0 & 0 \\ 0 & 1 & 0 \end{bmatrix} \frac{v d_2}{e_3^T v d_2} = \begin{bmatrix} \dfrac{\alpha_x - \beta_x \frac{\|t\|}{d_1}}{\alpha_z - \beta_z \frac{\|t\|}{d_1}} \\ \dfrac{\alpha_y - \beta_y \frac{\|t\|}{d_1}}{\alpha_z - \beta_z \frac{\|t\|}{d_1}} \end{bmatrix} \tag{6.11}$$

where $\alpha$ is defined in equation (6.3) and $\beta$ is defined as $$\beta = \begin{bmatrix} \beta_x \\ \beta_y \\ \beta_z \end{bmatrix} = R^T t_0 \tag{6.12}$$

As we can see from equation (6.11), if $t_0$, u and R are all fixed, i.e., $\alpha$ and $\beta$ are both fixed, the position of the feature image on the second image plane is a function of the ratio of $\|t\|$ and $$d_1, \text{ i.e., } \frac{\|t\|}{d_1}.$$

Furthermore, this function is continuous and monotonic in $$\frac{\|t\|}{d_1}.$$

So if we have some knowledge about the minimum distance $d_{min}$ on $d_1$, and some knowledge on the maximum value $\|t\|_{MAX}$ on $\|t\|$, we can obtain that the ratio $$\frac{\|t\|}{d_1}$$

takes values in the region $$\left(0, \frac{\|t\|MAX}{d_{min}}\right].$$

Substituting this result back into equation (6.11), we see that the feature correspondence should lie between the point:

$$p_0 = \begin{bmatrix} \alpha_x/\alpha_z \\ \alpha_y/\alpha_z \end{bmatrix} \quad (6.13)$$

which is exactly the same as in equation (6.2) corresponding to the image of the infinity point, and the point $$p_1 = \begin{bmatrix} \alpha_x - \beta_x \frac{\|t\|_{MAX}}{d_{min}} \\ \alpha_z - \beta_z \frac{\|t\|_{MAX}}{d_{min}} \\ \alpha_y - \beta_y \frac{\|t\|_{MAX}}{d_{min}} \\ \alpha_z - \beta_z \frac{\|t\|_{MAX}}{d_{min}} \end{bmatrix} \quad (6.14)$$

Now combining this result with the previous fact that the image must lie on the epipolar line, we conclude that the feature point should be observed within a line segment with terminal points $p_0$ and $p_1$ on the second image plane.

Translation Direction Information

Finally we discuss the case when the direction of translation varies, i.e., $t_0$ takes different values due to estimation errors. Assume that now $t_0$ becomes $t'_0$ which corresponds to the maximum perturbation, from equation (6.12) then $\beta$ changes to $\beta'$. So from equation (6.11), we can see that now the two terminal points are $$p_0 = \begin{bmatrix} \alpha_x/\alpha_z \\ \alpha_y/\alpha_z \end{bmatrix} \quad (6.15)$$

and $$p'_1 = \begin{bmatrix} \alpha_x - \beta'_x \frac{\|t\|_{MAX}}{d_{min}} \\ \alpha_z - \beta'_z \frac{\|t\|_{MAX}}{d_{min}} \\ \alpha_y - \beta'_y \frac{\|t\|_{MAX}}{d_{min}} \\ \alpha_z - \beta'_z \frac{\|t\|_{MAX}}{d_{min}} \end{bmatrix}. \quad (6.16)$$

Note that $p_0$ remains the same, while $p_1$ changes to $p'_1$. From this we can conclude that if the direction of the translation $t_0$ belongs to a certain region, then the possible image region that the feature could lie on the second image plane is a sector-like region, which has vertex $p_0$ and boundaries defined by equations (6.11) and (6.16).

2-Point and 0-Point RANSAC for Outlier Rejection

Introduction

In this section, we describe the 2-Point and 0-Point RANSAC for outlier rejection.

Problem Formulation and Approach

Suppose that we have two camera frames $I_1$ and $I_2$ captured by one or more images sources, where from both image frames we detected N common features, where $u_i$ is the observed feature i in frame $I_1$ presented in the homogeneous coordinates, similarly $v_i$ is the corresponding observation of feature i in the image frame $I_2$ presented in the homogeneous coordinates. Suppose that the orientation of image frame $I_2$ with respect to image frame $I_1$ is known and denoted by the rotation matrix R. So, the objective is to use RANSAC algorithm to reject the outlier features observed in the two image frames to estimate the unit translation vector between the two frames $t_0$. Since, RANSAC algorithm is based on solving the minimal problem to generate the initial hypothesis which is used in outlier detection based on how the observation will fit to the generated hypothesis. So, in our formulation the minimal problem can be solved using observations of the features in both frames $I_1$ and $I_2$, where we can see that $$t_0 \perp u_i \times Rv_i$$

$$t_0 \perp u_j \times Rv_j \quad (7.1)$$

where, $u_i$ and $u_j$ and two observation of two different features in frame $I_1$ and $v_i$ and $v_j$ are the corresponding observations of the two features in frame $I_2$, from these two relations we can evaluate the unit translation vector between the two frames as $$t_0 = (u_i \times Rv_i) \times (u_j \times Rv_j) \quad (7.2)$$

The next step in the RANSAC algorithm is to generate the consensus set of observed features that fit to the generated hypothesis based on the following condition, for each observed feature k in both frames:

$$t_0^T(u_k \times Rv_k) = 0 \quad (7.3)$$

where $t_0^T$ to denotes the transpose of the vector $t_0$. Note that this condition holds for noise free observations, but since it is not the case then we accept a feature k as an inlier if it satisfies the following condition:

$$(t_0^T(u_k \times Rv_k))^2 < \varepsilon \quad (7.4)$$

where $\varepsilon$ is the error tolerance of the deviation of an observation from the true value, which depends on the variance if the noise associated with the observations.

0-Point RANSAC

A special case of our configuration, which is considered as a singular configuration in the previous formulation, is when the translation between two frames is equal to zero (i.e. the camera only had rotational motion). In this case if we have a previous knowledge of just type of motion, then to reject feature outliers in image frames we do not need to generate any hypothesis, since the unit translation vector should be zero. And in this case we accept or reject an observation for a feature k based on the following condition:

$$\|u_k - Rv_k\| < \varepsilon \quad (7.5)$$

where, similarly e is the error tolerance of the deviation of an observation from the true value that is based on the variance of the noise, and R is the known rotation matrix between the two frames (i.e. the orientation of frame $I_2$ with respect to frame $I_1$.

FIG. 12 shows a detailed example of various devices that may be configured to implement some embodiments in accordance with the current disclosure. For example, device 500 may be a mobile sensing platform, a mobile phone, a workstation, a computing center, a cluster of servers or other example embodiments of a computing environment, centrally located or distributed, capable of executing the techniques described herein. Any or all of the devices may, for example, implement portions of the techniques described herein for vision-aided inertial navigation system.

In this example, a computer 500 includes a processor 510 that is operable to execute program instructions or software, causing the computer to perform various methods or tasks, such as performing the enhanced estimation techniques described herein. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

The described techniques may be applied in the following examples

Example 1

A vision-aided inertial navigation system comprising: an image source to produce image data comprising a plurality of images; an inertial measurement unit (IMU) to produce IMU data indicative of a motion of the vision-aided inertial navigation system; a processing unit comprising an estimator that processes the IMU data and a sliding window comprising a sequenced set of the images to compute state estimates for the vision-aided inertial navigation system along a plurality of degrees of freedom for the vision-aided inertial navigation system, wherein the estimator determines an orientation between the images and a set of feature correspondences in the images to detect a hovering condition during which a translation of the vision-aided inertial navigation is below a threshold amount.

Example 2

The vision-aided inertial navigation system of example 1, wherein upon detecting that the hovering condition, the estimator replaces a newest one of the images in the sequence of images window with a current image produced by the image source.

Example 3

The vision-aided inertial navigation system of example 1, wherein upon detecting that the absence of the hovering condition, the estimator drops an oldest one of the images in the sequence of images and includes within the sequence of images a current image produced by the image source.

Example 4

The vision-aided inertial navigation system of example 1, wherein the processing unit comprises an estimator that computes state estimates for unobservable degrees of freedom for the vision-aided inertial navigation system, wherein the estimator applies a constrained estimation algorithm that computes the state estimates for a subset of the unobservable degrees of freedom based on the IMU data and the image data while preventing computation of the state estimates for at least one of the unobservable degrees of freedom.

Example 5

The vision-aided inertial navigation system of example 1, wherein the estimator applies an Extended Kalman Filter (EKF) to compute the state estimates.

Example 6

The vision-aided inertial navigation system of example 1, wherein the processing unit applies visual simultaneous localization and mapping (V-SLAM) to compute orientation and position of features observed by the image source.

Example 7

The vision-aided inertial navigation system of example 1, wherein the processing unit applies a Multi-state Constraint Kalman Filter (MSC-KF) to compute visual-inertial odometry.

Example 8

The vision-aided inertial navigation system of example 1, wherein the estimator executes within a device that houses the image source and the IMU unit.

Example 9

The vision-aided inertial navigation system of example 1, wherein the estimator executes on a processor remote from the image source and the IMU unit.

Example 10

A method comprising: processing a sliding window comprising a sequenced set of images to detect a hovering condition during which a translation of a vision-aided navigation system is below a threshold amount of motion for each of a set of degrees of freedom; and computing a position and an orientation of the device based on the sliding window of the sequenced set of images and inertial measurement data for the device.

Example 11

The method of example 10, further comprising: upon detecting the hovering condition, replacing a newest one of the images in the sequence of images window with a current image produced by the image source; and upon detecting that the absence of the hovering condition, the estimator drops an oldest one of the images in the sequence of images and includes within the sequence of images a current image produced by the image source.

Example 12

The method of example 10, wherein computing the position and orientation comprises applying a constrained estimation algorithm to compute state estimates for only a subset of unobservable degrees of freedom based on the IMU data and the image data while preventing computation of state estimates for at least one of the unobservable degrees of freedom.

Example 13

The method of example 10, further comprising computing a map of an area traversed by the vision-aided inertial navigation system based at least in part on the sliding window of images.

Example 14

The method of example 10, further comprising computing an odometry traversed by the device based at least in part on the sliding window of images.

Example 15

The method of example 10, further comprising computing at least one of a pose of the device, a velocity of the device, a displacement of the device and 3D positions of visual landmarks based at least in part on the sliding window of images.

Example 16

The method of example 10, wherein the computing state estimates comprises applying an Extended Kalman Filter (EKF) to compute the state estimates.

Example 17

The method of example 10, further comprising applying visual simultaneous localization and mapping (V-SLAM) to compute orientation and position of features observed by the image source based at least in part on the sliding window of images.

Example 18

The method of example 10, further comprising applying a Multi-state Constraint Kalman Filter (MSC-KF) to compute visual-inertial odometry based at least in part on the sliding window of images.

Example 19

The method of example 10, further comprising executing an estimator within the device that houses the image source and the IMU to compute the position and the orientation of the device based on the sliding window.

Example 20

The method of example 10, wherein the computing state estimates comprises executing an estimator on a processor remote from the image source and the IMU unit to compute the position and the orientation of the device based on the sliding window.

Example 21

A method for time synchronization of a vision-aided inertial navigation system comprising: receiving a set of images produced by an image source of the vision-aided inertial navigation system; receiving, from an inertial measurement unit (IMU) rigidly connected to the image source, IMU data indicative of motion of the vision-aided inertial navigation system; and computing a time synchronization difference for a local clock of the image source and a local clock of the IMU based on the images and IMU data.

Example 22

A method for computing relative-orientations of sensors within a vision-aided inertial navigation system comprising: receiving a set of pose frames from a first sensor of the vision-aided inertial navigation system; receiving a second set of pose frames from a second sensor of the vision-aided inertial navigation system; and computing relative orientations of the first sensor and the second sensor based on the first set of pose frames and the second set of pose frames.

Example 23

The method of example 22, wherein the first sensor comprises an image source that produces a set of images and the second sensor comprises an inertial measurement unit (IMU) that produces IMU data indicative of motion of the vision-aided inertial navigation system, and wherein the method further comprises computing an orientation and velocity of the vision-aided inertial navigation system based on the image data, the IMU data and the relative orientations.

Example 24

The method of example 22, wherein computing an orientation and velocity comprises computing state estimates for unobservable degrees of freedom for sensing device based on the image data and the IMU data, wherein computing the state estimates comprises applying a constrained estimation algorithm to compute the state estimates for only a subset of the unobservable degrees of freedom based on the IMU data and the image data while preventing computation of state estimates for at least one of the unobservable degrees of freedom.

Example 25

A method for calibration of a vision-aided inertial navigation system comprising: defining a set of calibration parameters to indicate that a frame of a calibration board of the vision-aided inertial navigation system to have a same rotation around a gravity vector as a global frame applied by an estimator of the vision-aided inertial navigation system such that the calibration board and the global frame differ only by a roll angle and a pitch angle; receiving image data produced by an image source associated with the calibration board of the vision-aided inertial navigation system; receiving, from an inertial measurement unit (IMU), IMU data indicative of motion of the vision-aided inertial navigation system; and computing an orientation and velocity of the vision-aided inertial navigation system based on the image data, the IMU data and the calibration parameters.

Example 26

The method of example 25, wherein computing an orientation and velocity comprises computing state estimates for unobservable degrees of freedom for sensing device based on the image data and the IMU data, wherein computing the state estimates comprises applying a constrained estimation algorithm to compute the state estimates for only a subset of the unobservable degrees of freedom based on the IMU data and the image data while preventing computation of state estimates for at least one of the unobservable degrees of freedom.

Example 27

A method for point feature tracking within a vision-aided inertial navigation system comprising: receiving a set of images produced by an image source of the vision-aided inertial navigation system; receiving, from an inertial measurement unit (IMU), IMU data indicative of motion of the vision-aided inertial navigation system; identifying a feature within a first one of the images; determining, based on the IMU data, a rotation and translation from the first one of the images to at least a second one of the images; identifying a portion of one of the second one of images based on the determine rotation and translation; and process the portion of the second one of the images without processing a remaining portion of the second one of the images to match the feature of the first one of the images to a feature of the second one of the images.

Example 28

A method for rejecting outliers within a set of features identified within images captured by a vision-aided inertial navigation system, the method comprising: receiving a first set of images produced by a vision-aided inertial navigation system; receiving a second set of images produced by a vision-aided inertial navigation system; receiving, from an inertial measurement unit (IMU), IMU data indicative of motion of the vision-aided inertial navigation system; determining an orientation of the first set of images relative to the second set of images based on the IMU data; and processing the first set of images and the second set of images to identify a set of common features based on the IMU data.

Example 29

The method of example 28, wherein the first set of images are produced by a first image source of the vision-aided inertial navigation system and the second set of images are produced by a second image source of the vision-aided inertial navigation system.

Example 30

The method of example 28, wherein the first set of images are produced by a first image source of the vision-aided inertial navigation system at a first orientation and the second set of images are produced by the first image source of the vision-aided inertial navigation system at a second rotation without translation of the image source.

Example 31

A method for computing state initialization for an inertial navigation system as described herein.

Example 32

A sensing system to perform any of the methods described herein.

Example 33

A mobile device to perform any of the methods described herein.

Example 34

A computing system to perform any of the methods described herein.

Example 35

A computer-readable medium comprising program code to execute any of the methods described herein.

Various embodiments of the invention have been described. These and other embodiments are within the scope of the following claims.

The invention claimed is:

1. A method for calibration of a vision-aided inertial navigation system comprising:
   receiving image data produced by an image source of the vision-aided inertial navigation system (VINS), wherein the image data captures features of a calibration target;
   receiving, from an inertial measurement unit (IMU) of the VINS, IMU data indicative of motion of the VINS; and
   computing, based on the image data and the IMU data and using an estimator of the VINS, calibration parameters for the VINS concurrently with computation of a roll and pitch of the calibration target at least by applying a constrained estimation algorithm to compute state estimates based on the image data and the IMU data while preventing projection of information from the image data and the IMU data along at least one unobservable degree of freedom of the VINS,
   wherein the calibration parameters define relative positions and orientations of the IMU and the image source of the VINS.

2. The method of claim 1, wherein computing, based on the image data and the IMU data, calibration parameters for the VINS concurrently with computation of the roll and pitch of the calibration target comprises:
   constructing an enhanced state vector that specifies a plurality of state estimates to be computed, wherein the state vector specifies the plurality of state estimates to include the roll and the pitch of the calibration target as well as the calibration parameters for the VINS; and
   iteratively processing the enhanced state vector with a Kalman Filter to compute the roll and the pitch of the calibration target concurrently with computation of calibration parameters for the VINS.

3. The method of claim 2, wherein the enhanced state vector specifies the calibration parameters to be computed as relative positions, orientations and velocities of the IMU and the image source and one or more signal biases for the IMU.

4. The method of claim 2, wherein the enhanced state vector specifies the calibration parameters to be computed as an orientation of a global frame of reference relative to an IMU frame of reference, an orientation of the image source relative to the IMU frame of reference, a position and a velocity of the IMU within the global frame of reference, a position of the image source within the IMU frame of reference, and a set of bias vectors for biases associated with signals of the IMU.

5. The method of claim 2, wherein iteratively applying the Kalman Filter comprises applying a Multi-state Constraint Kalman Filter (MSC-KF) that applies the constrained estimation algorithm to prevent the projection of information from the image data and IMU data along the at least one unobservable degrees of freedom of the VINS.

6. The method of claim 1, wherein computing the calibration parameters for the VINS concurrently with computation of the roll and pitch of the calibration target comprises applying the constrained estimation algorithm to compute the state estimates by projecting information from the image data and IMU data for at least translations in horizontal and vertical directions while preventing projection of information from the image data and IMU data along the at least one unobservable degree of freedom, the at least one unobservable degree of freedom comprising at least a gravity vector.

7. The method of claim 1, wherein computing the calibration parameters further comprises processing the image data to reject one or more outliers within a set of features identified within the image data by:
   receiving a first portion of the image data as a first set of images produced by the image source;
   receiving a second portion of the image data as a second set of images produced by the image source;
   determining an orientation of the first set of images relative to the second set of images based on the IMU data;
   processing the first set of images and the second set of images to identify a set of common features based on the IMU data.

8. The method of claim 7, wherein the first set of images are produced by a first image source of the VINS and the second set of images are produced by a second image source of the VINS.

9. The method of claim 7, wherein the first set of images are produced by a first image source of the VINS at a first orientation and the second set of images are produced by the first image source of the VINS at a second rotation without translation of the first image source.

10. The method of claim 1, wherein the calibration target is not aligned with gravity.

11. The method of claim 1, wherein the VINS comprises a robot or a vehicle.

12. The method of claim 1, wherein the VINS comprises one of a mobile sensing platform, a mobile phone, a workstation, a computing center, or a set of one or more servers.

13. A vision-aided inertial navigation system (VINS) comprising:
   an image source to produce image data comprising a plurality of images;
   an inertial measurement unit (IMU) comprising at least one of an accelerometer or a gyroscope, the IMU being configured to produce IMU data indicative of a motion of the VINS while producing the image data, wherein the image data captures features of an external calibration target;
   one or more processors configured to process the IMU data and the image data to compute calibration parameters for the VINS concurrently with computation of a roll and pitch of the calibration target at least by applying a constrained estimation algorithm to compute state estimates based on the image data and the IMU data while preventing projection of information from the image data and the IMU data along at least one unobservable degree of freedom of the VINS,
   wherein the calibration parameters define relative positions and orientations of the IMU and the image source of the VINS.

14. The vision-aided inertial navigation system (VINS) of claim 13,
wherein the one or more processors are further configured to construct an enhanced state vector that specifies a plurality of state estimates to be computed based on the image data and the IMU data, wherein the state vector specifies the plurality of state estimates to include the roll and the pitch of the calibration target as well as the calibration parameters for the VINS, and
wherein the one or more processors are further configured to iteratively process the enhanced state vector with a Kalman Filter to compute the roll and the pitch of the calibration target concurrently with computation of calibration parameters for the VINS.

15. The vision-aided inertial navigation system (VINS) of claim 13, wherein the one or more processors execute within a device that houses the image source and the IMU.

16. The vision-aided inertial navigation system (VINS) of claim 13, wherein the one or more processors are remote from the image source and the IMU unit.

17. The vision-aided inertial navigation system (VINS) of claim 13, wherein the VINS comprises one of a mobile sensing platform, a mobile phone, a workstation, a computing center, or a set of one or more servers.

18. The vision-aided inertial navigation system (VINS) of claim 13, wherein the image source comprises one or more of a cameras that capture 2D or 3D images, a laser scanner that produces a stream of 1D image data, a depth sensor that produces image data indicative of ranges for features within an environment and a stereo vision system having multiple cameras to produce 3D information.

19. The vision-aided inertial navigation system of claim 13, wherein the vision-aided inertial navigation comprises a robot or a vehicle.

20. A method for calibration of a vision-aided inertial navigation system, further comprising:
receiving image data produced by an image source of the vision-aided inertial navigation system (VINS), wherein the image data captures features of a calibration target;
receiving, from an inertial measurement unit (IMU) of the VINS, IMU data indicative of motion of the VINS;
computing, based on the image data and the IMU data and using an estimator of the VINS, calibration parameters for the VINS concurrently with computation of a roll and pitch of the calibration target, wherein the calibration parameters define relative positions and orientations of the IMU and the image source of the VINS;
after computing the calibration parameters for the VINS, receiving a second set of images produced by the image source of the VINS;
receiving, from the inertial measurement unit (IMU) of the vision-aided inertial navigation system, IMU data indicative of motion of the VINS while capturing the second set of images;
processing the second set of images as a sliding window of sequenced images to detect a hovering condition during which a translation of the VINS is below a threshold amount of motion for each of a set of degrees of freedom; and
computing a position and an orientation of the VINS based on the sliding window of the sequenced set of images and inertial measurement data for the device.

21. The method of claim 20, further comprising:
upon detecting the hovering condition, replacing a newest one of the images in the sliding window of sequenced images with a current image produced by the image source; and
upon detecting that the absence of the hovering condition, dropping an oldest one of the images in the sliding window of sequenced images and including the current image within sliding window of sequenced images the current image.

22. The method of claim 20, further comprising computing a map of an area traversed by the vision-aided inertial navigation system based at least in part on the sliding window of sequenced images.

23. The method of claim 20, further comprising computing an odometry traversed by the device based at least in part on the sliding window of sequenced images.

24. The method of claim 20, further comprising computing at least one of a pose of the device, a velocity of the device, a displacement of the device and 3D positions of visual landmarks based at least in part on the sliding window of sequenced images.

* * * * *